US012753856B2

(12) United States Patent
Mason et al.

(10) Patent No.: US 12,753,856 B2
(45) Date of Patent: Oct. 6, 2026

(54) CAM DRIVEN FLUID VALVE ASSEMBLY

(71) Applicant: Robert Bosch GmbH, Stuttgart (DE)

(72) Inventors: Paul Mason, Dearborn, MI (US); David Toutant, Grosse Pointe Woods, MI (US); Christopher Franklin, Canton, MI (US); Hank Brockner, Brownstown, MI (US); Markus Vollmer, Appenweier (DE); Stephen Zukowski, Howell, MI (US); Thomas Chapman, Templeton, MA (US)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 19/095,610

(22) Filed: Mar. 31, 2025

(65) Prior Publication Data

US 2026/0298367 A1 Oct. 1, 2026

(51) Int. Cl.
*F16K 11/22* (2006.01)
*F16K 31/524* (2006.01)
*F16K 31/528* (2006.01)

(52) U.S. Cl.
CPC ........ *F16K 31/52483* (2013.01); *F16K 11/22* (2013.01); *F16K 31/5286* (2013.01)

(58) Field of Classification Search
CPC ............. F16K 31/5286; F16K 11/0655; F16K 31/52483; F16K 31/52475; F16K 27/044; Y10T 137/86759; F01P 7/00; F01P 2007/146; F01P 7/165
See application file for complete search history.

(56) References Cited

U.S. PATENT DOCUMENTS

| | | | | |
|---|---|---|---|---|
| 2,235,990 A * | 3/1941 | Guttery | F16K 31/5286 | 74/59 |
| 2,423,393 A * | 7/1947 | Lauck | F16K 31/52416 | 91/457 |
| 3,185,435 A * | 5/1965 | Hauser | F16K 3/184 | 251/232 |
| 3,894,715 A * | 7/1975 | Whittaker | F16K 5/204 | 251/231 |
| 4,262,879 A * | 4/1981 | Gonner | F15C 3/02 | 137/881 |

(Continued)

FOREIGN PATENT DOCUMENTS

| | | |
|---|---|---|
| DE | 60008673 T2 | 2/2005 |
| DE | 102014204120 | 9/2015 |
| ES | 1237579 | 9/2019 |

*Primary Examiner* — Marina A Tietjen
(74) *Attorney, Agent, or Firm* — Kelly McGlashen; Maginot, Moore & Beck LLP

(57) ABSTRACT

A cam-driven valve assembly includes a valve housing that supports an array of sliding-gate fluid valves to control the flow of fluid therethrough. The assembly includes a plurality of cams supported on a cam shaft. Each cam includes a pair of cam discs that define an inner cam track that is disposed internally with respect to an outer surface of the cam and an outer cam track that is disposed on the outer surface of the cam. The inner cam track is configured to engage with the valve body of a first one of the valves, and the outer cam track is configured to engage with the valve body of a second one of the valves, whereby the cam is capable of moving the valve body of both the first and second one of the valves upon rotation of the cam shaft.

18 Claims, 12 Drawing Sheets

(56) References Cited

U.S. PATENT DOCUMENTS

| | | | | |
|---|---|---|---|---|
| 4,844,127 | A * | 7/1989 | Horsch | F16H 61/0276 137/637.1 |
| 5,230,367 | A * | 7/1993 | Minch | F16L 55/02718 137/625.33 |
| 6,062,826 | A * | 5/2000 | Morimoto | F16K 31/52408 137/624.13 |
| 6,095,192 | A * | 8/2000 | Gleasman | F04B 1/14 137/625.68 |
| 8,869,832 | B2 * | 10/2014 | Baumann | F16K 47/08 137/625.33 |
| 9,702,273 | B2 | 7/2017 | Cobb | |
| 10,788,143 | B2 | 9/2020 | Biester et al. | |
| 11,238,501 | B2 | 2/2022 | Cecur | |
| 2005/0218359 | A1 * | 10/2005 | Davis | F15B 15/068 251/29 |
| 2016/0015573 | A1 | 1/2016 | Ihde, II | |
| 2024/0240730 | A1 * | 7/2024 | Schmitt | F16K 3/0254 |

* cited by examiner

CAM DRIVEN FLUID VALVE ASSEMBLY

BACKGROUND

In an electric vehicle, a thermal management system can be used to provide heating and/or cooling to control the temperature of various vehicle components, systems and/or compartments. The thermal management of an electric vehicle may be complex. For example, to provide cooling, the thermal management system includes a coolant control system that directs coolant via one or more fluid pumps to and from the vehicle components, systems and/or compartments via a complex system of fluid pipes and fluid valves. To provide heating, the thermal management system includes a refrigerant control system that directs refrigerant through components that provide a refrigeration cycle. In some vehicles, multiport fluid valves may be used to control the flow of fluid through the thermal management system. However, when the thermal management system is sufficiently complex, multiport fluid valves become large in size to accommodate three, eight, twelve, sixteen or more ports as required by the system. In some cases, the size of the fluid valves becomes so large that it may become difficult to meet the packaging requirements of the thermal management system within the vehicle.

SUMMARY

A vehicle thermal management system includes a coolant control system having a cam-driven fluid valve assembly that can be used by the system to direct coolant, for example, to cool a drive motor, a charge air heat exchanger, a battery, power electronics modules, the vehicle passenger cabin and/or other vehicle components or systems that require temperature control.

For purposes of operational and packaging efficiency, it may be useful to combine multiple components of the vehicle thermal management system into a single, integrated module. Such a module may include the coolant control system, the refrigerant control system or both. The coolant control system may include, for example, one or more circulation pumps, a fluid reservoir, one or more fluid valves, a coolant control system controller, sensors, heat exchangers, etc. A housing of the module may include internal passageways that permit fluid communication between the various components of the system included in the module. Portions of the module housing may be configured to replace housing elements of certain components. For example, a portion of the module housing may be used to provide a lid of a fluid valve and/or fluid valve assembly, whereby the fluid valve assembly is connected to the module housing. For other components, the module may be configured to permit the component to "plug into" an appropriately configured portion of the module housing.

In the illustrated embodiment, a cam-driven fluid valve assembly includes a valve housing that may be integrated in the module housing (e.g., at least a portion of the valve housing may be common to the module housing). The valve housing of the cam-driven fluid valve assembly is configured to define a plurality of fluid passageways and to support an array of sliding gate valves in the fluid passageways in such a way that the flow of fluid through the valve housing is controlled. The assembly includes a plurality of cams supported on a cam shaft. The cam shaft may be driven to rotate by an actuator. The cams rotate in concert with the cam shaft and each cam is arranged to control the open/closed state of one or more sliding gate valves.

Rotation of the cam shaft results in actuation of the valves via the cams and the cams may vary in shape, size and/or contact surface angle to allow for individual valve actuation times and durations. In some embodiments, the cam shaft and cams are arranged to open and close the fluid valves of the assembly in such a way that multiple fluid valves may allow direction of fluid to a single location and/or a single fluid valve may direct fluid to multiple locations depending on the vehicle operating conditions.

The cam-driven fluid valve assembly receives fluid actuated by one or more fluid pumps that may be integrated into the integrated module. The fluid pressures generated by the fluid pumps are sufficiently low that many components of the cam-driven fluid valve assembly, including the stationary plates and/or the movable plates of the gate valves, may be formed of plastic or may be plastic that is reinforced with metal at strategic location, which reduces the cost and weight of the module and improves durability.

Cams are used to directly open and close the gate valves. Each cam includes a pair of cam discs, which are fixed together in a parallel and spaced-apart configuration. The inward-facing planar surface of each disc of the pair of cam discs includes a disc inner groove. Within each pair of cam discs, the disc inner grooves are mirror images of each other. The disc inner grooves of the pair of cam discs cooperate to provide an eccentric, inner cam track that at least partially encircles the cam shaft rotational axis. As used herein, the term "eccentric path" refers to a path that deviates from a circular shape and/or is non-concentric with a rotational axis of the cam.

For each cam, the outward-facing planar surface of each disc of the pair of cam discs includes a disc outer groove. The first cam disc outer groove of a given cam faces the second cam disc outer groove of an adjacent cam. Together, the first cam disc outer groove of the given cam and the second cam disc outer groove of the adjacent cam cooperate to provide an eccentric first outer cam track that at least partially encircles the cam shaft rotational axis.

In addition, the second cam disc outer groove of the given cam faces the first cam disc outer groove of another (e.g., the opposite side) adjacent cam. Together, the second cam disc outer groove of the given cam and the first cam disc outer groove of the oppositely adjacent cam cooperate to provide an eccentric second outer cam track that at least partially encircles the cam shaft rotational axis.

Thus, some cams of the cam assembly may include a first outer cam track that controls a position of a valve body of a first valve, an inner can track that controls a position of a valve body of a second valve and a second outer cam track that controls a position of a valve body of a third valve.

In the illustrated embodiment, the cam assembly includes sliding gate valves in which a stationary plate serves as a valve seat. In addition, a movable plate of each respective valve serves as a valve body. Each sliding gate valve may be mechanically connected to a corresponding cam. The movable plate of the gate valve includes a cam follower. A portion of the cam follower, for example a pin, is received within the respective cam track and follows the path as the cam rotates.

In this embodiment, the movable plates associated with the first and second outer cam tracks are disposed on one side of the rotational axis, while the movable plate of the inner cam track is disposed on an opposed side of the rotational axis and all movable plates are disposed in a common plane. This arrangement in which the moveable plates are coplanar and the movable plates having an inner track connection are disposed on opposite sides of the rotational axis relative to movable plates having an outer track connection provides a more closely packed arrangement as compared to an arrangement in which the movable plates are only connected to the inner cam track of each cam and/or each cam is associated with a single valve.

The cams along the cam shaft may include one or more eccentric cam tracks, each cam track is associated with a different valve. In addition, each individual cam track can define a different opening and closing profile or sequence for each valve. This allows for individual actuation of each valve. In some embodiments, a subset of the valves may open at different times than the other valves. In other embodiments, each valve may open at a different time than the other valves.

The dual-disk cam in which one, two or three different valves may be simultaneously connected via a cam follower to a unique cam track of the cam can be compared to some cam driven fluid valve assemblies in which peripheral surfaces of the cams have protruding lobes that are used to open the valves. In such assemblies, the force from the camshaft pushes against the valve through a pushrod to open the valve. As the valve opens, the valve compresses a spring. The stored energy in the spring is used to push the valve against pushrod, which in turn is pushed against the camshaft lobe. As the camshaft turns and the lobe rotates away from the valve, the valve closes. In this assembly, each valve requires a pushrod and spring, increasing design and manufacturing complexity and cost. In addition, the spring force increases the torque required to turn the camshaft as compared to a spring-free configuration. By connecting the valve to an inner or outer cam track of the cam, springs and push rods can be omitted, whereby assembly is simplified and the torque required to turn the cam shaft is reduced.

In embodiments in which the valves are sliding gate valves, the moveable plate of each sliding gate valve includes a leg that protrudes toward the cam shaft. The leg terminates in a cam follower that is mechanically enmeshed with an inner or outer cam track of a respective one of the cams in such a way that rotation of the cam results in movement of the movable plate within a plane that is parallel to the first stationary plate. In some embodiments, the housing of the valve assembly may include features that provide support to, and/or guide the movement of, the cam follower portion of the sliding gate valves. In the illustrated embodiment, the features include guide teeth that protrude inward into the gaps between respective cams and respective cam discs. The guide teeth provide physical boundaries on each of opposed sides of the cam follower that constrain movement of the cam follower to the plane in which the movable plates reside.

In some aspects, a valve assembly includes an assembly housing having ports. Each port is configured to permit fluid communication between an environment of the assembly housing and an interior space of the assembly housing. The valve assembly includes valves disposed in the interior space. Each valve has a valve seat that includes a valve seat through-opening. The valve seat is disposed in the assembly housing and is fixed relative to the assembly housing so as to face a corresponding one of the ports. Each valve has a valve body that is movable relative to the valve seat. The valve body is disposed in the assembly housing and is movable with the assembly housing between a first position and a second position. In the first position, fluid is permitted to flow through the valve seat through opening. In the second position, fluid is prevented from flowing through the valve seat through opening. The valve assembly includes a cam shaft that is supported on the assembly housing. The cam shaft extends into the interior space. The cam shaft is configured to rotate about a rotational axis relative to the assembly housing. In addition, the valve assembly includes cams that are disposed in the interior space and supported on the cam shaft. Each cam is configured to rotate in concert with the cam shaft. Each cam has an inner cam track that is disposed internally with respect to an outer surface of the cam and an outer cam track that is disposed on the outer surface of the cam. Each of the inner cam track and the outer cam track of a given cam at least partially encircles the rotational axis. The inner cam track of the given cam is configured to engage with the valve body of a first one of the valves, and the outer cam track of the given cam is configured to engage with the valve body of a second one of the valves. The given cam is capable of moving both the valve body of the first one of the valves and the valve body of the second one of the valves upon rotation of the cam shaft.

In some embodiments, the outer cam track includes a first outer cam track and a second outer cam track. The first outer cam track of the given cam is configured to engage with the valve body of the second one of the valves. The second outer cam track of the given cam is configured to engage with the valve body of a third one of the valves. The given cam is capable of moving both the valve body of the first one of the valves, the valve body of the second one of the valves and the valve body of the third one of the valves upon rotation of the cam shaft.

In some embodiments, the first outer cam track is disposed on a first outer surface of the given cam, and the second outer cam track is disposed on a second outer surface of the given cam. The first outer surface of the given cam and the second outer surface of the given cam are disposed on opposite sides of the given cam.

In some embodiments, the given cam comprises a pair of cam discs. The pair of cam discs includes a first cam disc and a second cam disc. The first cam disc has a first cam disc inner surface that faces the second cam disc. The first cam disc has a first cam disc outer surface on a side of the first cam disc that is opposite the first cam disc inner surface and faces away from the second cam disc. The second cam disc has a second cam disc inner surface that faces the first cam disc. The second cam disc has a second cam disc outer surface on a side of the second cam disc that is opposite the second cam disc inner surface and faces away from the first cam disc. At least one of the first cam disc inner surface and the second cam disc inner surface includes an inner groove that defines the inner cam track.

In some embodiments, the second cam disc is directly connected to the first cam disc and rotates in concert with the first cam disc.

In some embodiments, at least one of the first cam disc outer surface and the second cam disc outer surface includes an outer groove that at least partially defines the outer cam track.

In some embodiments, the outer cam track comprises a first outer cam track and a second outer cam track. The first cam disc outer surface includes a first cam disc outer groove that at least partially defines the first outer cam track, and the second cam disc outer surface includes a second cam disc outer groove that at least partially defines the second outer cam track.

In some embodiments, each cam comprises a pair of cam discs. The pair of cam discs includes a first cam disc and a second cam disc. The first cam disc and the second cam disc of each pair of cam discs cooperate to define the respective inner cam track therebetween. The valve body of the first one of the valves is mechanically connected to the inner cam track of the corresponding one of the cams via a cam follower. In addition, a portion of the cam follower of the valve body of the first one of the valves is received in and engages with the inner cam track.

In some embodiments, the portion of the cam follower of the valve body of the first one of the valves is a pin that protrudes from at least one of opposed sides of the cam follower and is received in the inner cam track.

In some embodiments, the valve body of the second one of the valves is mechanically connected to the outer cam track of the corresponding one of the cams via a cam follower, and a portion of the cam follower of the valve body of the second one of the valves is received in and engages with the outer cam track.

In some embodiments, at least one of the valves is a sliding gate valve in which the valve seat is a stationary plate and the valve body is a movable plate that moves relative to the stationary plate. The movable plate of each sliding gate valve is independently connected to one of the cams via a cam follower. Each cam includes a first cam disc and a second cam disc that is fixed to and stacked with the first cam disc in a direction parallel to the rotational axis. In addition, each cam includes the inner cam track that is disposed between the first cam disc and the second cam disc. The inner cam track is defined by a surface of at least one of the first cam disc and the second cam disc. A portion of the cam follower of the movable plate of the at least one of the valves is received in the inner cam track of one of at least one of the cams.

In some embodiments, each cam includes a cam gap that is disposed between the first cam disc and the second cam disc. The portion of the cam follower of the movable plate of the at least one of the valves is received in the cam gap.

In some embodiments, a first one of the cams is connected to a valve body of each of two different valves.

In some embodiments, a second one of the cams is connected to a valve body of each of three different valves.

In some embodiments, a valve body of a first one of the valves is connected to a first one of the cams, and a valve of a second one of the valves is connected to both the first one of the cams and a second one of the cams.

In some embodiments, each cam comprises a first cam disc fixed to a second cam disc. The first cam disc includes a first cam inner surface that faces the second cam disc, a first cam outer surface that faces away from the second cam disc, a first cam through opening that extends between the first cam inner surface and the first cam outer surface and receives the cam shaft therethrough, and a first cam disc inner groove formed in the first cam inner surface. The first cam disc inner groove surrounds at least a portion of the first cam through opening. The second cam disc includes a second cam inner surface that faces the first cam disc, a second cam outer surface that faces away from the first cam disc, a second cam through opening that extends between the second cam inner surface and the second cam outer surface and receives the cam shaft therethrough, and a second cam disc inner groove formed in the second cam inner surface. The second cam disc inner groove surrounds at least a portion of the second cam through opening. The first cam disc inner groove and the second cam disc inner groove cooperate to form the inner cam track.

In some embodiments, the second cam disc inner groove has a profile that corresponds to a mirror image of the profile of the first cam disc inner groove.

In some embodiments, the cams comprise a first cam and a second cam. The first cam disc of the first cam includes a first cam disc outer groove formed in the first cam outer surface. The first cam disc outer groove surrounds at least a portion of the first cam through opening. The second cam disc of the second cam includes a second cam disc outer groove formed in the second cam outer surface. The second cam disc outer groove surrounds at least a portion of the second cam through opening. The first cam outer surface of the first cam faces the second cam outer surface of the second cam. The first cam disc outer groove of the first cam disc of the first cam and the second cam disc outer groove of the second cam disc of the second cam cooperate to form the outer cam track.

DETAILED DESCRIPTION

Figure 1:
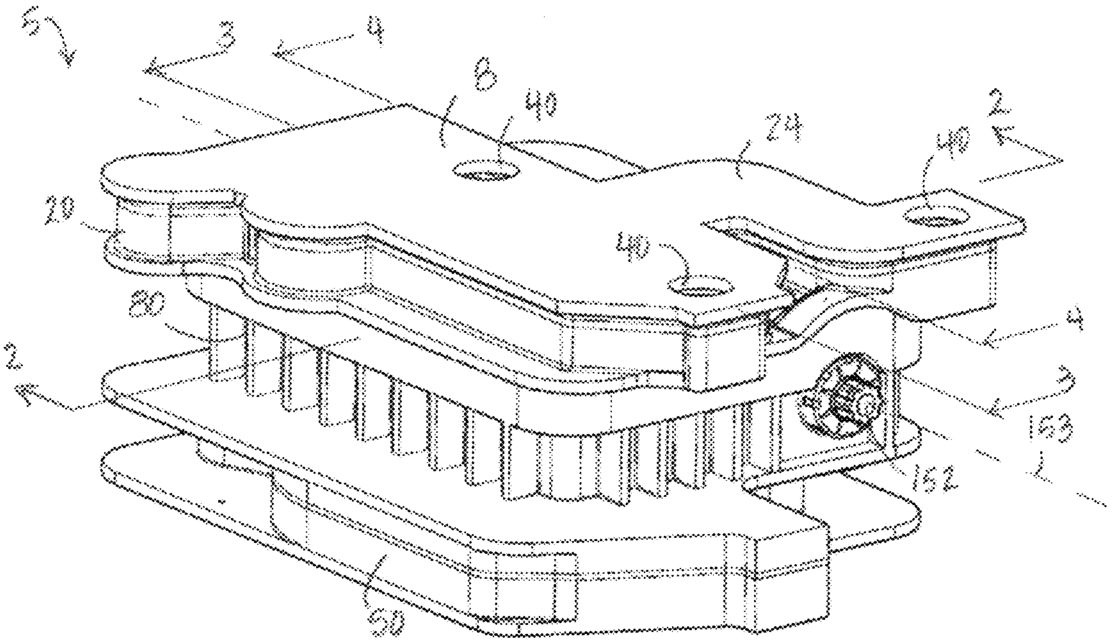
FIG. 1 is a perspective view of cam-driven fluid valve assembly.

Referring to FIG. 1-6, a cam-driven fluid valve assembly 5 can be used to control fluid flow in a fluid circuit such as may be found in a vehicle thermal management system, for example to control coolant flow through a coolant circuit. In some embodiments, the valve assembly 5 may be a stand-alone component that can be connected to fluid lines of the fluid circuit. In the illustrated embodiment, the valve assembly 5 is integrated into a module that also includes other components of the vehicle thermal management system and integrates them into a single, integrated unit.

The valve assembly 5 includes an assembly housing 8 that is configured to house sliding gate valves 120 and a cam drive assembly 150 that is actuated by a motor (not shown). The cam drive assembly 150 includes a cam shaft 152 and cams 160 which drive the sliding gate valves 120 in such a way that fluid flow through the assembly housing 8 is controlled.

Figure 2:
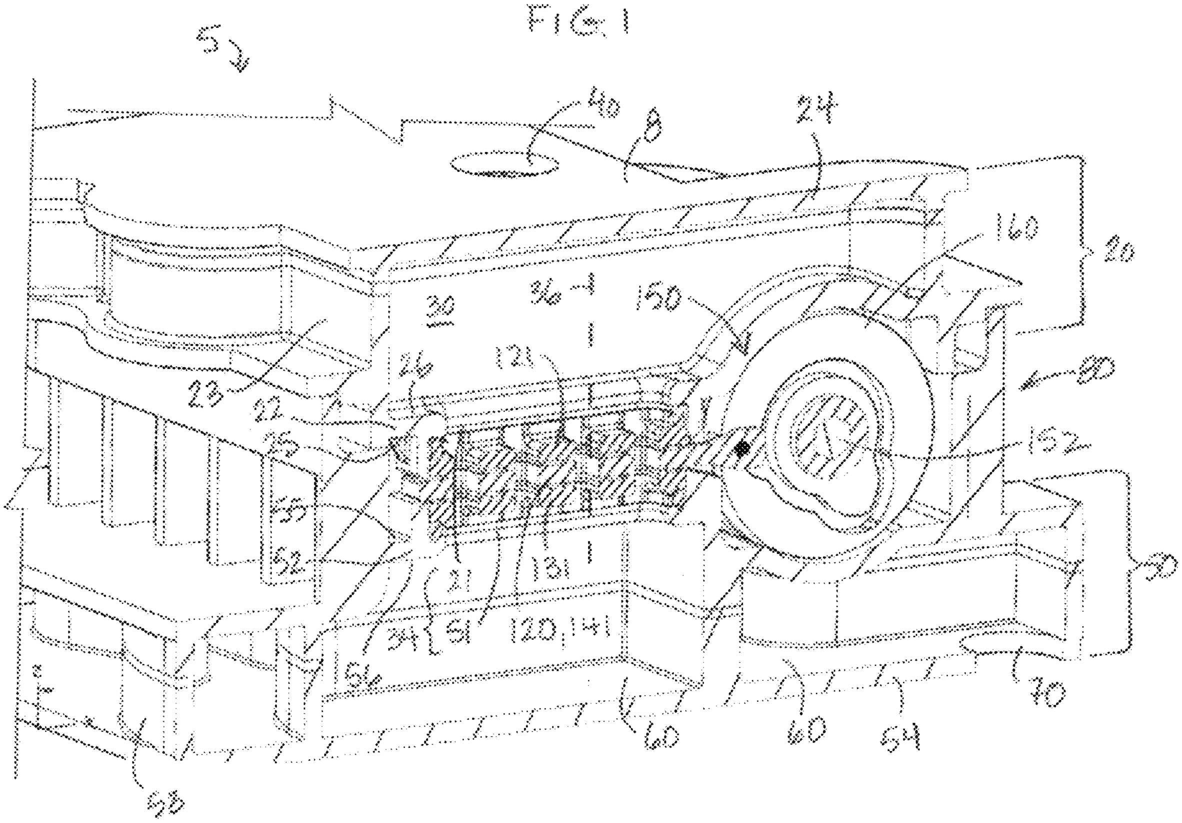
FIG. 2 is a perspective cross-sectional view of the cam-driven fluid valve assembly as seen along line 2-2 of FIG. 1.
Figure 3:
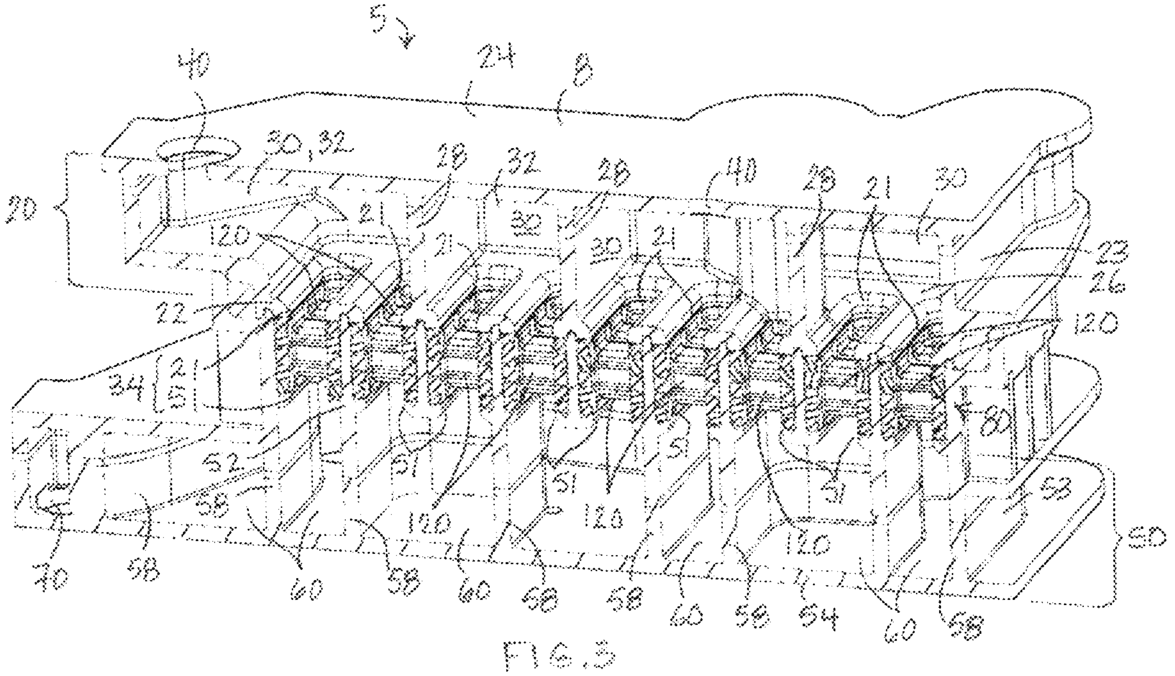
FIG. 3 is a perspective cross-sectional view of the cam-driven fluid valve assembly as seen along line 3-3 of FIG. 1.
Figure 4:
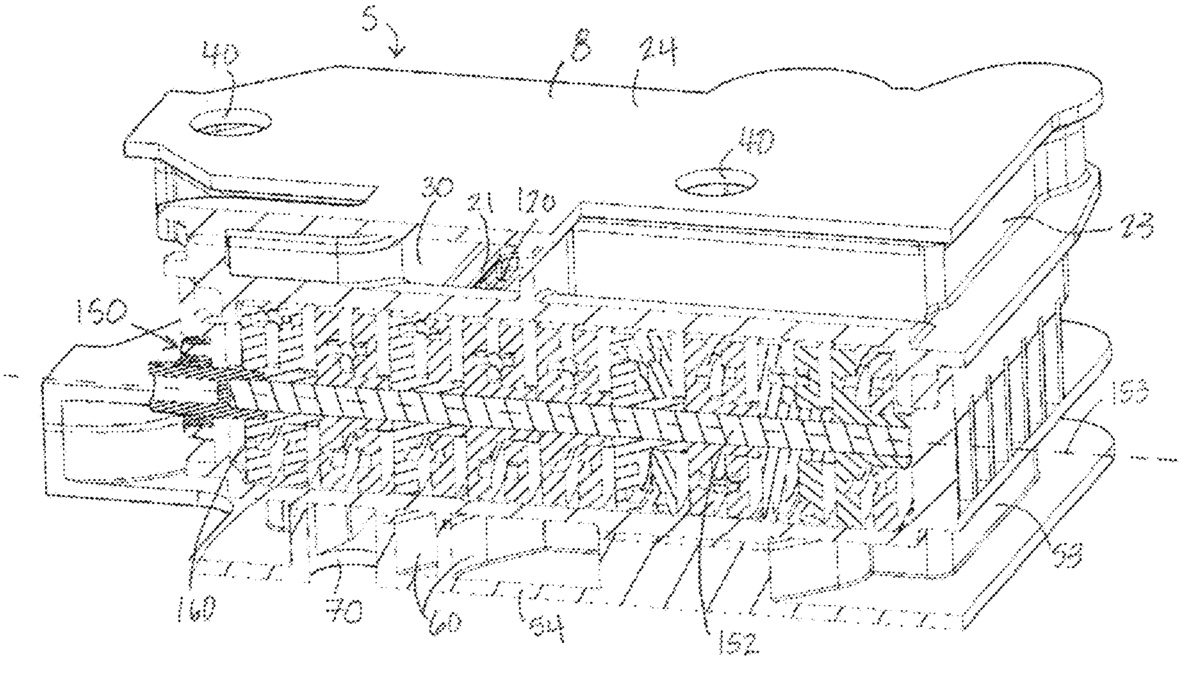
FIG. 4 is a perspective cross-sectional view of the cam-driven fluid valve assembly as seen along line 4-4 of FIG. 1.
Figure 5:
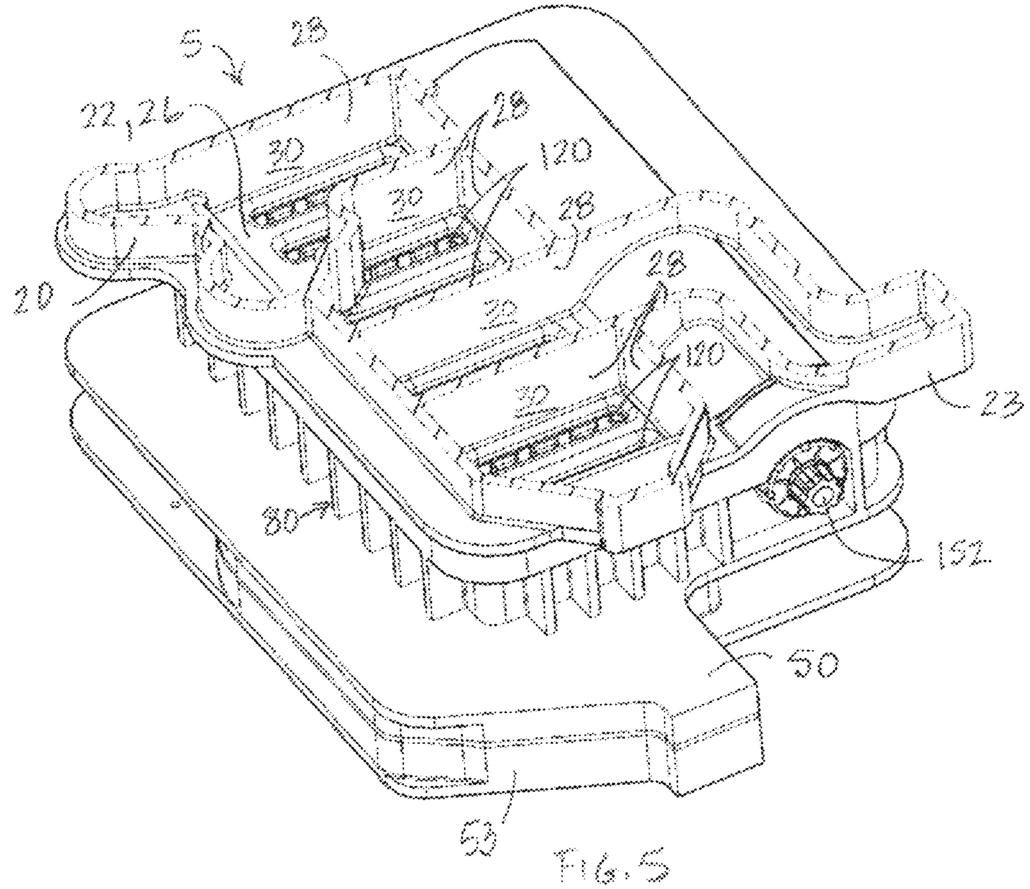
FIG. 5 is a top perspective cross-sectional view of the cam-driven fluid valve assembly as seen along a line passing through the first manifold illustrating the fluid passageways within the first manifold.
Figure 6:
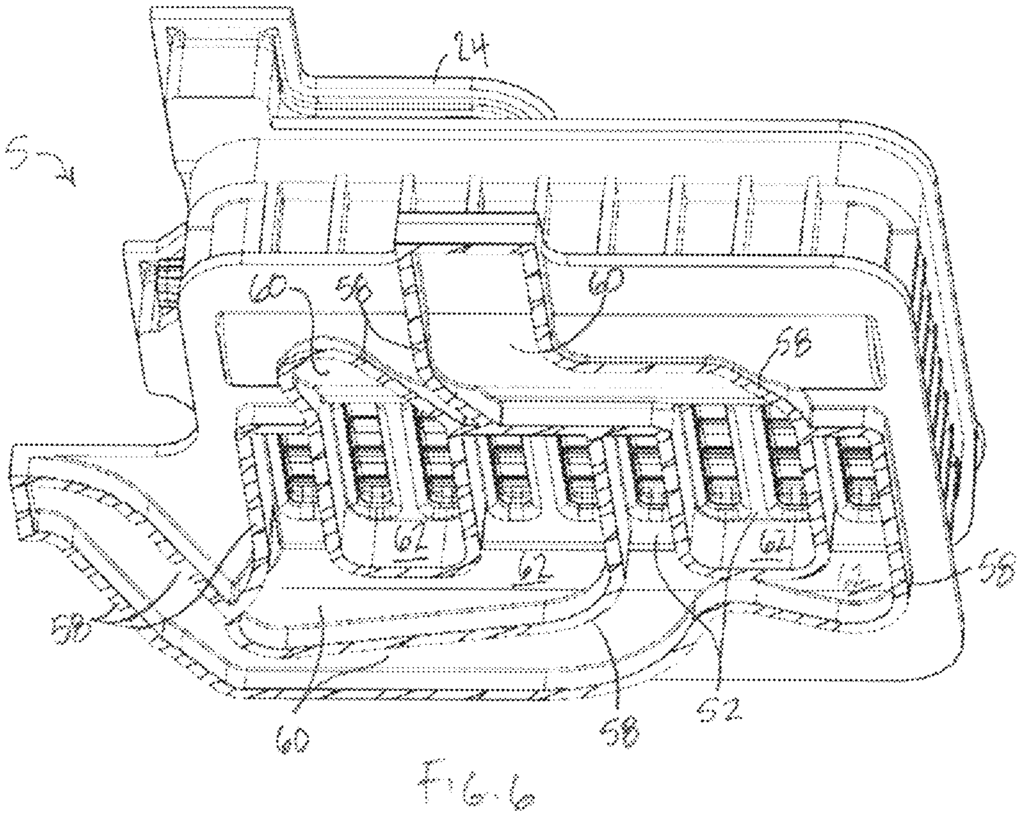
FIG. 6 is a bottom perspective cross-sectional view of the cam-driven fluid valve assembly as seen along a line passing through the second manifold illustrating the fluid passageways within the second manifold.
Figure 7:
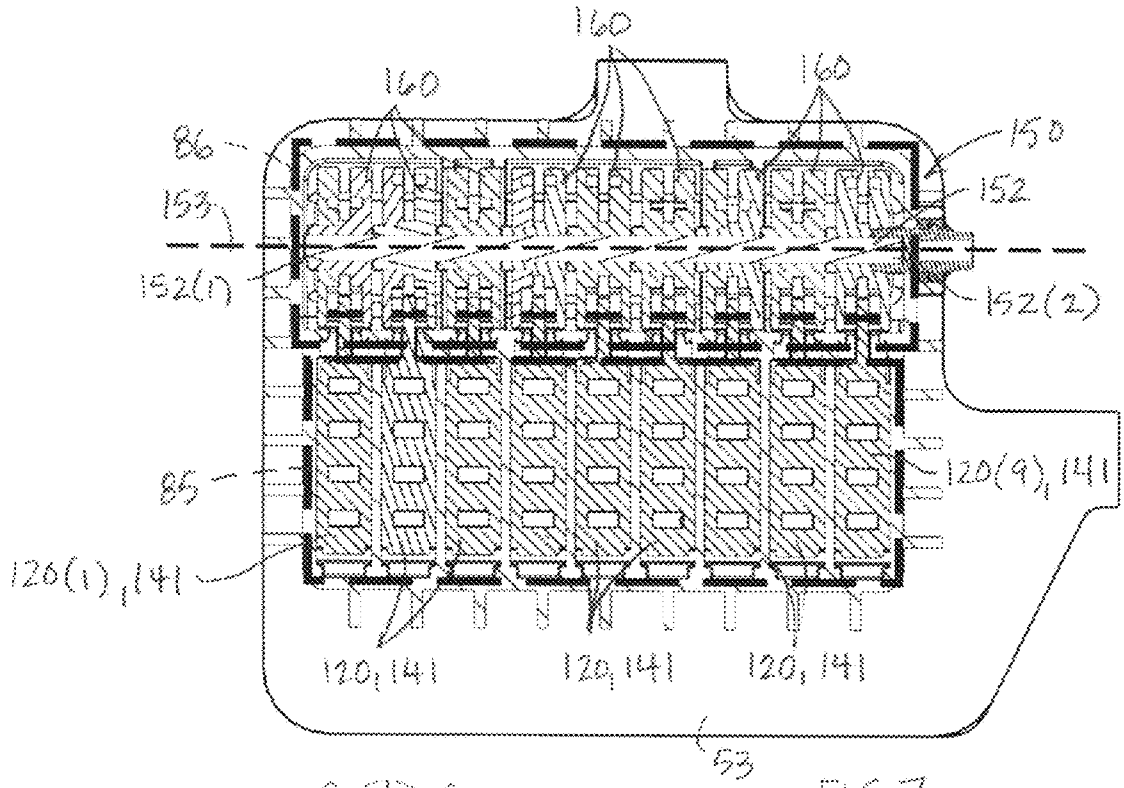
FIG. 7 is a top plan cross-sectional view of the cam-driven fluid valve assembly as seen along a line passing through the valve chamber illustrating the fluid control region and the valve drive region.
Figure 8:
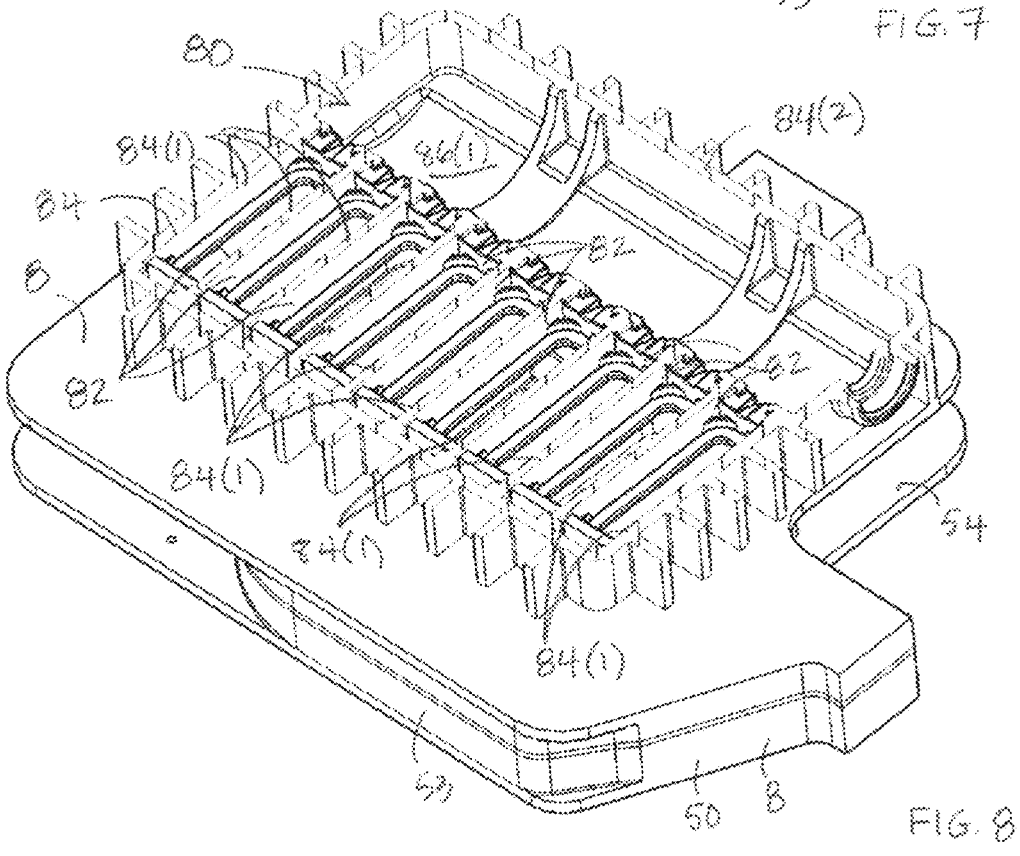
FIG. 8 is a top perspective cross-sectional view of the cam-driven fluid valve assembly as seen along a line passing through the valve chamber with the cam drive assembly omitted.

The assembly housing 8 is a multilayer structure that includes a first manifold 20, a second manifold 50 and a valve chamber 80. The assembly housing 8 has a stacked or layered configuration in which the first manifold 20 overlies the second manifold 50 such that the valve chamber 80 is defined therebetween. References to direction used herein such as above, below, over, under, overlying, underlying, etc., are made with respect to the orientation of the valve assembly 5 as shown in FIGS. 1 and 2. The orientation of the valve assembly 5 is not limited to that shown in FIGS. 1 and 2, and the references to direction are relative only and are not intended to be limiting.

The first manifold 20 has first fluid passageways 30 that provide a fluid connection between first circuit ports 40 and first valve ports 21. The first circuit ports 40 provide a connection between the coolant circuit and the first fluid passageways 30 of the first manifold 20. The first valve ports 21 provide a connection between the first fluid passageways 30 and the fluid valves 120 of the valve assembly 5.

Similarly, the second manifold 50 has second fluid passageways 60 that provide a fluid connection between second circuit ports 70 and second valve ports 51. The second circuit ports 70 provide a connection between the coolant circuit and the second fluid passageways 60 of the second manifold 50. The second valve ports 51 provide a connection between the second fluid passageways 60 and fluid valves 120 of the valve assembly 5. Each second valve port 51 is aligned with a corresponding one of the first valve ports 21 to form a port pair 34.

The valve assembly housing 8 defines the valve chamber 80 that is disposed between the first manifold 20 and the second manifold 50. In addition, the valve assembly 5 includes fluid valves 120 and the cam drive assembly 150 which are disposed in the valve chamber 80.

The cam drive assembly 150 includes the cam shaft 152 and the cams 160 that are fixed to the cam shaft 152. Each cam 160 is configured to individually activate one or more of the fluid valves 120. The fluid valves 120 and cam shaft 152 are disposed in the valve chamber 80 and cooperate to control fluid flow between the first and second valve ports 21, 51 of each port pair 34. In the valve chamber 80, the fluid valves 120 are arranged side-by-side along one side of the cam shaft 152.

Actuation of the cam shaft 152 permits each cam 160 to move a valve body of one or more fluid valves 120, whereby the timing, sequencing and pattern of fluid flow through the assembly housing 8, and also the coolant circuit, can be precisely controlled. In addition, the first and second manifolds 20, 50 of the valve assembly 5 each provide a large number of valve ports 21(1), 21(2), 21(3) . . . **21(*n*) and 51(1), 51(2), 51(3) . . . 51(*n*) in a somewhat compact package, accommodating a complex fluid circuit and allowing for multiple modes of fluid delivery. The variable n is an integer greater than zero. The value of n is determined by the requirements of the specific application. For example, in the illustrated embodiment, the number n of first valve ports 21, second valve ports 51 and valve port pairs 34** is nine.

The first manifold 20 includes a first manifold plate 22 (e.g., first housing plate 22) that adjoins and is surrounded by a first manifold housing 23. The first manifold housing 23 is closed at one end by the first manifold plate 22. An opposed end of the first manifold housing 23 may be closed by a first manifold cover 24. In some embodiments, the first manifold cover 24 may be an internal portion of the assembly housing 8 that is common with a portion of a module. The first manifold cover 24 includes the first circuit ports 40 that permit fluid flow from the first fluid passageways 30 to other components of the fluid circuit. The first manifold cover 24 overlies the first manifold plate 22, and an interior space of the first manifold 20 is defined between the first manifold plate 22, the first manifold cover 24 and the first manifold housing 23.

The first manifold plate 22 has a first plate inner side 25 that faces toward the second manifold 50 and is common with the valve chamber 80. In addition, the first manifold plate 22 has a first plate outer side 26 that faces away from the valve chamber 80 and the second manifold 50.

The first manifold plate 22 includes multiple first valve ports 21(1), 21(2), 21(3) . . . **21(*n*) which are through holes that extend from the first plate inner side 25 to the first plate outer side 26**.

The first manifold 20 includes first plate partitions 28 (FIGS. 3 and 5) that extend between the first plate outer side 26 and the first manifold cover 24. The first plate partitions 28 segregate the first valve ports 21 into a plurality of first valve port groups 32. Each first valve port group 32 includes at least one first valve port 21. The first plate partitions 28 may be arranged so that some first valve port groups 32 include a plurality of first valve ports 21. The arrangement of the first valve port groups 32 is determined by the requirements of the specific application. In addition, at locations between the first valve ports 21 and the first manifold housing 23, the first plate partitions 28 may segregate the interior space of the first manifold 20 into the first fluid passageways 30 that connect, and permit fluid communication between, a first valve port group 32 and, for example, one or more of the first circuit ports 40 that provide a connection to fluid lines of the coolant circuit.

The second manifold 50 includes a second manifold plate 52 (e.g., second housing plate 52) that adjoins and is surrounded by a second manifold housing 53. The second manifold housing 53 is closed at one end by the second manifold plate 52. An opposed end of the second manifold housing 53 is closed by a second manifold cover 54. In some embodiments, the second manifold cover 54 may be an external portion of the assembly housing 8 that is common with a portion of the module. The second manifold cover 54 includes the second circuit ports 70 that permit fluid flow from the second fluid passageways 60 to other components of the coolant system. The second manifold cover 54 underlies the second manifold plate 52, and an interior space of the second manifold 50 is defined between the second manifold plate 52, the second manifold cover 54 and the second manifold housing 53.

The second manifold plate 52 is parallel to or substantially parallel to the first manifold plate 22. As used here, the term "substantially" refers to within two degrees to four degrees from parallel and is used to account for variations that may normally occur during manufacturing and/or assembly. The second manifold plate 52 has a second plate inner side 55 that faces toward the first manifold 20 and is common with the valve chamber 80. In addition, the second manifold plate 52 has a second plate outer side 56 that faces away from the valve chamber 80 and the first manifold 20.

The second manifold plate 52 includes multiple second valve ports 51(1), 51(2), 51(3) . . . **51(*n*) which are through holes that extend from the second plate inner side 55 to the second plate outer side 56. The number of second valve ports 51 corresponds to the number of first valve ports 21, so in the illustrated embodiment, the number n of second valve ports 51** equals nine.

Each second valve port 51 is aligned with a corresponding one of the first valve ports 21 in a direction parallel to a port pair axis 36 to form the respective port pairs 34, where the port pair axis 36 is perpendicular to each of the first manifold plate 22 and the second manifold plate 52. In other words, each second valve port 51(1), 51(2), 51(3) . . . **51(*n*) is paired with a corresponding one of the first valve ports 21(1), 21(2), 21(3) . . . 21(*n*) to form a respective port pair 34(1), 34(2), 34(3) . . . 34(*n*), where the valve ports 21, 51 that provide the port pair 34 are aligned in a direction parallel to the port pair axis 36**.

The second manifold 50 includes second plate partitions 58 (FIGS. 3 and 6) that extend between the second plate outer side 56 and the second manifold cover 54. The second plate partitions 58 segregate the second valve ports 51 into a plurality of second valve port groups 62. Each second valve port group 62 includes at least one second valve port 51. The second plate partitions 58 may be arranged so that some second valve port groups 62 include a plurality of second valve ports 51. The arrangement of the second valve port groups 62 is determined by the requirements of the specific application. In addition, at locations between the second valve ports 51 and the second manifold housing 53, the second plate partitions 58 may segregate the interior space of the second manifold 50 into the second fluid passageways 60 that connect, and permit fluid communication between, a second valve port group 62 and, for example, one or more of the second circuit ports 70 that provide a connection to fluid lines of the coolant circuit.

Referring to FIGS. 2-3 and 7-8, the valve chamber 80 is disposed between and adjoins the first manifold 20 and the second manifold 50. The valve chamber 80 is in fluid communication with the first manifold 20 via the first valve ports 21 and is in fluid communication with the second manifold 50 via the second valve ports 51. The valve chamber 80 includes wall portions 84 that extend between the first plate inner side 25 and the second plate inner side 55. The wall portions 84 segregate the valve chamber 80 into a fluid control region 85 and a valve drive region 86 that are arranged side-by-side. The fluid control region 85 serves as a fluid valve bank and is configured to support an array of fluid valves 120. The valve drive region 86 adjoins the fluid control region 85. The valve drive region 86 receives the cam drive assembly 150 and is configured to support the cam shaft 152 for rotation relative to the assembly housing 8.

The wall portions 84(1) in the fluid control region 85 surround the first valve port 21 and the second valve port 51 of each port pair 34 and segregate the fluid control region 85 into cells 82 in such a way that each cell 82 is separated from adjacent cells 82. Each cell 82 is shaped and dimensioned to receive and support a single fluid valve 120. In addition, each cell 82 and the fluid valve 120 disposed therein is aligned with one of the port pairs 34, and each fluid valve 120 is configured to control fluid flow between the first valve port 21 and the second valve port 51 of a respective port pair 34. As a result, the fluid valves 120 are arranged side-by-side on one side of the cam shaft 152 in such a way that a first fluid valve 120(1) of the array is at a first end 152(1) of the cam shaft 152 and the jth fluid valve **120(*j*) of the array is at a second end 152(2) of the cam shaft 152, where j corresponds to the number of fluid valves 120** in the array In the illustrated embodiment, j equals nine, but is not limited to this value.

The wall portions 84(2) in the valve drive region 86 define an interior space 86(1) that receives the cam shaft 152 and the cams 160.

Referring to FIGS. 9-14, an alternative embodiment valve assembly 205 can be used to control fluid flow in a fluid circuit, for example to control coolant flow through a coolant circuit. The valve assembly 205 shown in FIGS. 9-14 is substantially similar to the valve assembly 5 shown in FIGS. 1-8 except for the arrangement of the fluid valves within the valve chamber and the details of the cams 260 employed in the cam drive assembly 250. Elements that are common to both the valve assembly 5 shown in FIGS. 1-8 and the valve assembly 205 shown in FIGS. 9-14 are referred to by common reference numbers.

The valve assembly 205 includes an assembly housing 208 that is configured to house sliding gate valves 120 and a cam drive assembly 250 that is actuated by a motor (not shown). The cam drive assembly 250 includes a cam shaft 152 and cams 260 which drive the sliding gate valves 120 in such a way that fluid flow through the assembly housing 208 is controlled.

Figure 9:
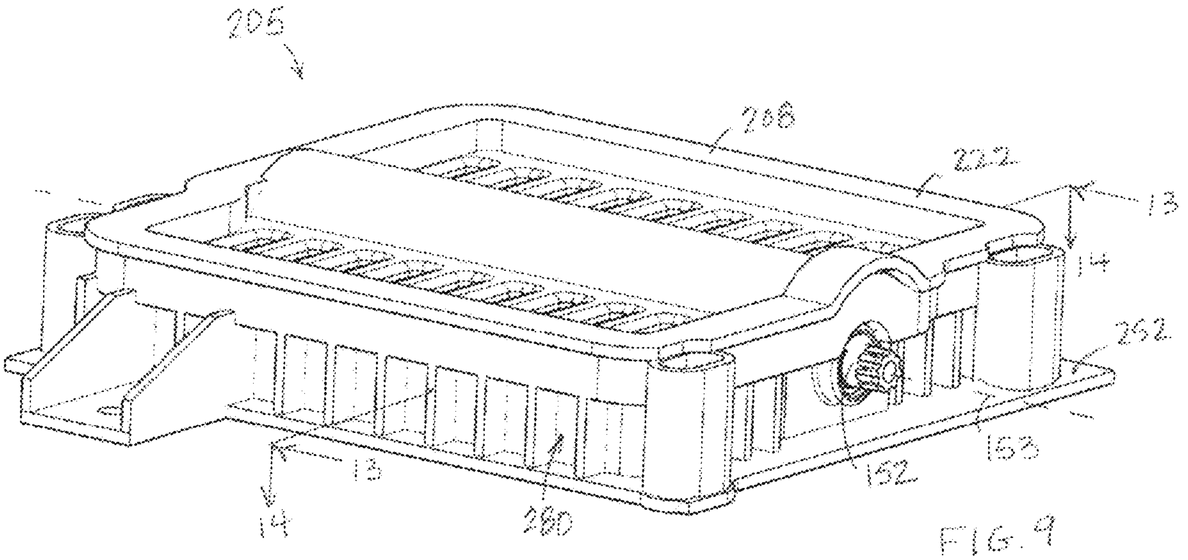
FIG. 9 is a perspective view of an alternative embodiment cam-driven fluid valve assembly, shown with the first manifold omitted except for the first housing plate and the second manifold omitted except for the second housing plate.
Figure 10:
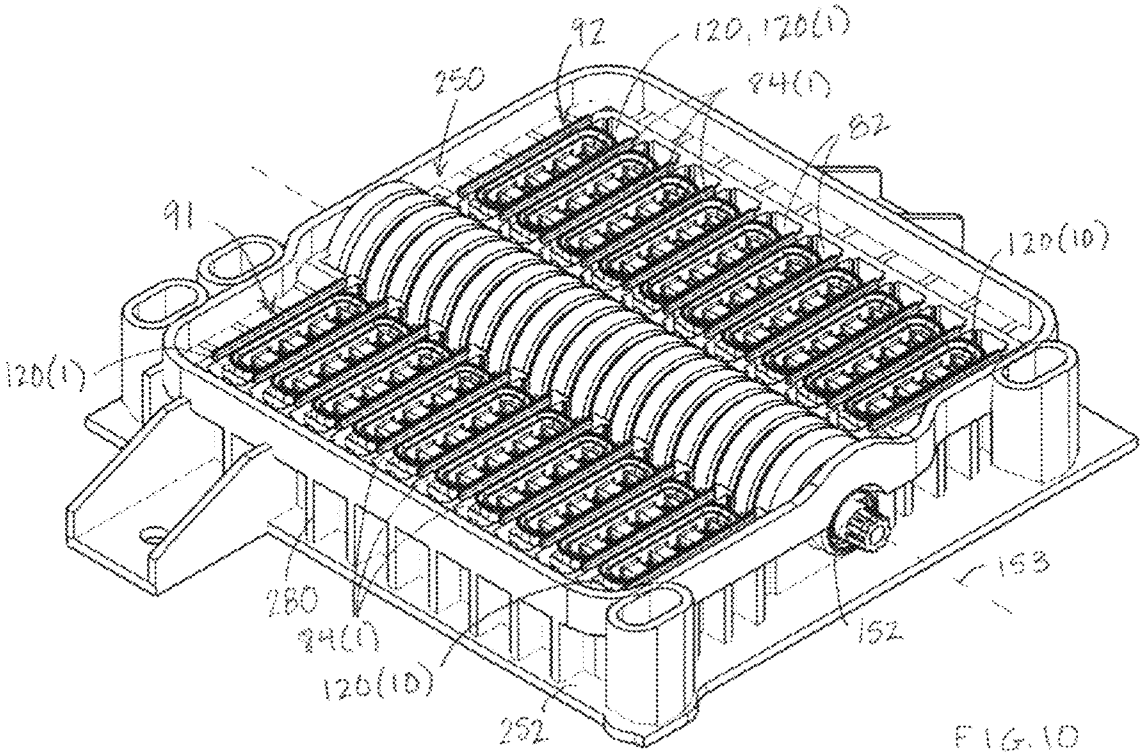
FIG. 10 is a perspective view of the cam-driven fluid valve assembly of FIG. 9, shown with the first housing plate omitted.

The assembly housing 208 is a multilayer structure that includes a first manifold (not shown), a second manifold (not shown) and a valve chamber 280. The assembly housing 208 has a stacked or layered configuration in which the first manifold overlies the second manifold such that the valve chamber 280 is defined therebetween. References to direction used herein such as above, below, over, under, overlying, underlying, etc., are made with respect to the orientation of the valve assembly 205 as shown in FIG. 9. The orientation of the valve assembly 205 is not limited to that shown in FIG. 9, and the references to direction are relative only and are not intended to be limiting.

The valve chamber 280 is disposed between and adjoins the first and second manifolds. The valve chamber 280 is in fluid communication with the first manifold via the first valve ports 21 and is in fluid communication with the second manifold via the second valve ports 51.

Figure 12:
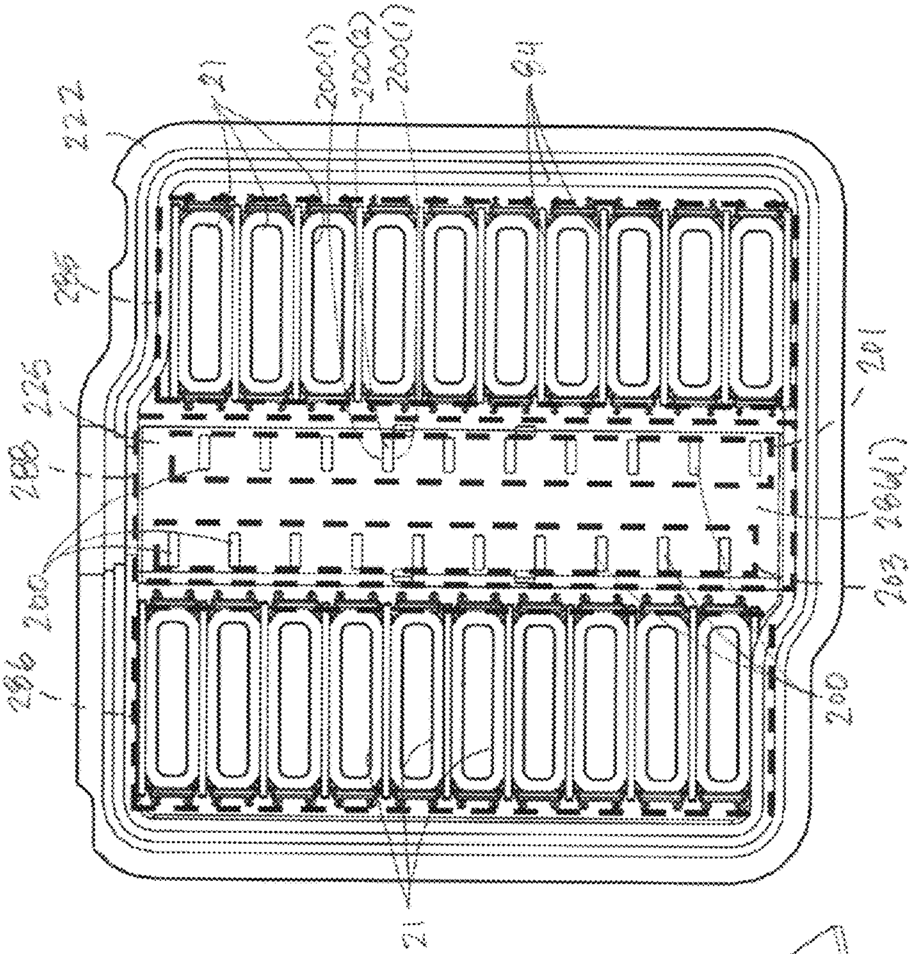
FIG. 12 is a bottom plan view of first housing plate of the cam driven fluid valve assembly of FIG. 9.
Figure 11:
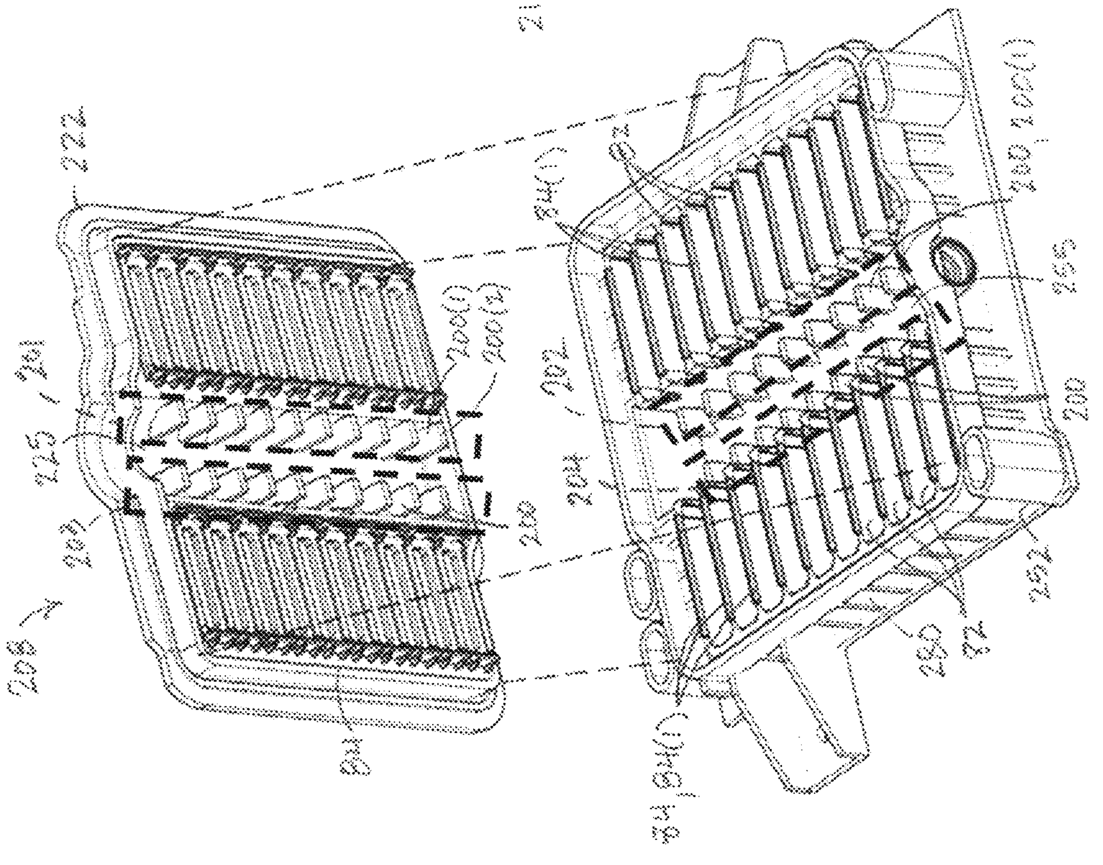
FIG. 11 is an exploded perspective view of the cam-driven fluid valve assembly of FIG. 9, shown with the cam drive assembly and fluid valves omitted.

The valve chamber 280 includes wall portions 84 that extend between the inner side 225 of the first housing plate 222 and the inner side 255 of the second housing plate 252. The wall portions 84 segregate the valve chamber 280 into a first fluid control region 285, a second fluid control region 286 and a centrally-disposed valve drive region 288 (FIG. 12). The first fluid control region 285 adjoins, and is disposed on, one side of the valve drive region 288. The first fluid control region 285 serves as a fluid valve bank and is configured to support a first array 91 of fluid valves 120. The second fluid control region 286 adjoins, and is disposed on, an opposed side of the valve drive region 288 relative to the first fluid control region 285. The second fluid control region 286 serves as a fluid valve bank and is configured to support a second array 92 of fluid valves 120. The valve drive region 288 is disposed between the first and second fluid control regions 285, 286 and is configured to receive and rotatably support the cam drive assembly 280.

Each of the first and second arrays 91, 92 includes a 1-by-j array of fluid valves 120, where j represents the number of fluid valves 120 in the array. In the illustrated embodiment, j equals ten, but is not limited to this value.

In the valve chamber 280, the fluid valves 120 disposed in the first array 91 are arranged side-by-side on one side of the cam shaft 152 in such a way that a first fluid valve 120(1) of the first array 91 is at a first end 152(1) of the cam shaft 152 and the jth fluid valve 120(10) of the first array 91 is at a second end 152(2) of the cam shaft 152.

Similarly, the fluid valves 120 disposed in the second array 92 are arranged side-by-side on the opposed side of the cam shaft 152 in such a way that a first fluid valve 120(1) of the second array 92 is at a first end 152(1) of the cam shaft 152 and the jth fluid valve 120(10) of the second array 92 is at a second end 152(2) of the cam shaft 152. Although the fluid valves 120 of the first and second arrays 91, 92 are generally coplanar, the fluid valves 120 of the second array 92 are offset axially relative to the fluid valves 120 of the first array 91 by an amount corresponding to an axial dimension of a cam disc 161, 181 of a cam 260.

The wall portions 84(1) in the first and second fluid control regions 285, 286 surround the first valve port 21 and the second valve port 51 of each port pair 34 and segregate the valve chamber 280 into cells 82 in such a way that each cell 82 is separated from adjacent cells 82. Each cell 82 is shaped and dimensioned to receive and support a single fluid valve 120 therein. In addition, each cell 82 and the fluid valve 120 disposed therein is aligned with one of the port pairs 34, and each fluid valve 120 is configured to control fluid flow between the first valve port 21 and the second valve port 51 of a respective port pair 34.

The wall portions 84(1) in each of the first and second fluid control regions 285, 286 define a one-by-i array of cells 82. As used herein, the variable i represents the number of cells 82 and is an integer greater than zero. In the illustrated embodiment, i is ten.

The wall portions 84(2) in the valve drive region 286 define an interior space 286(1) that receives the cam shaft 152 and the cams 260 and supports the cam shaft 152 for rotation relative to the assembly housing 208.

The valve drive region 286 includes guide teeth 200 that guide the motion of the moving component of each fluid valve 120 during rotation of the cam shaft 152. For example, when the fluid valve is a sliding gate valve, the guide teeth 200 guide the motion of a leg 146 of a movable plate 141 of the fluid valve 120.

Figure 13:
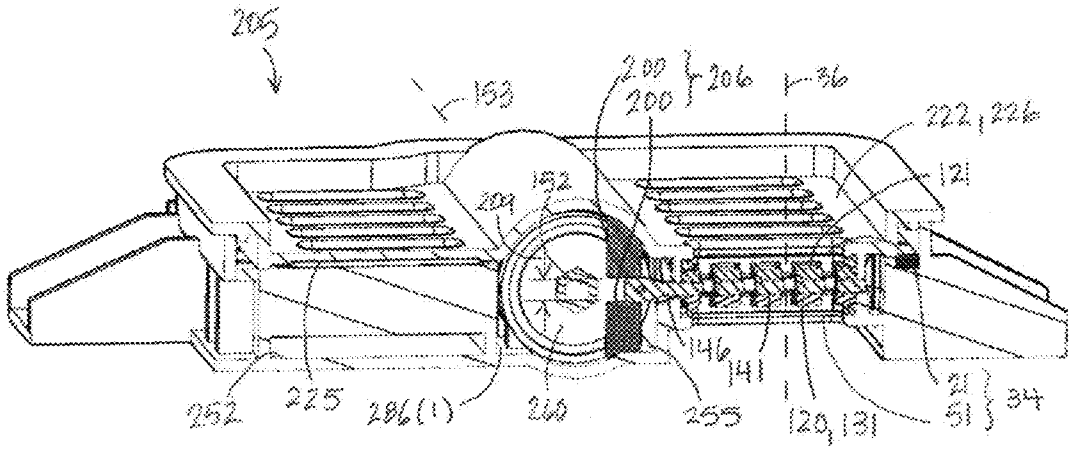
FIG. 13 is a cross-sectional view of the cam-driven fluid valve assembly of FIG. 9 as seen along line 13-13 of FIG. 9.

The guide teeth 200 include a first subset 201 of guide teeth 200 and a second subset 202 of guide teeth 200. The first subset 201 of the guide teeth 200 protrudes inward from an inner surface 225 of the first housing plate 222 toward the second housing plate 252. The second subset 202 of the guide teeth 200 protrudes inward from an inner surface 255 of the second housing plate 252 toward the first housing plate 222. Both the first subset 201 and the second subset 202 of guide teeth 200 are disposed in the valve drive region 288 between the cam shaft 152 and the first fluid control region 285. Each guide tooth 200 of the first subset 201 is aligned in a direction that is parallel to the port pair axes 36 with a respective one of the guide teeth 200 of the second subset 202 (FIG. 13). Each guide tooth 200 of the first subset 201 and the aligned guide tooth 200 of the second subset 202 form a guide tooth pair 206. The guide tooth pairs 206 formed by the first and second subsets 201, 202 are spaced apart along a line that lies parallel to the rotational axis 153. A guide tooth pair 206 is provided for each fluid valve 120 of the first array 91.

The guide teeth 200 include a third subset 203 of guide teeth 200 and a fourth subset 204 of guide teeth 200. The third subset 203 of the guide teeth 200 protrudes inward from an inner surface 225 of the first housing plate 222 toward the second housing plate 252. The fourth subset 204 of the guide teeth 200 protrudes inward from an inner surface 255 of the second housing plate 252 toward the first housing plate 222. Both the third subset 203 and the fourth subset 204 of guide teeth 200 are disposed in the valve drive region 288 between the cam shaft 152 and the second fluid control region 286. Each guide tooth 200 of the third subset 203 is aligned in a direction that is parallel to the port pair axes 36 with a respective one of the guide teeth 200 of the fourth subset 204. Each guide tooth 200 of the third subset 203 and the aligned guide tooth 200 of the fourth subset 204 form a guide tooth pair 206. The guide tooth pairs 206 formed by the third and fourth subsets 203, 204 are spaced apart along a line that lies parallel to the rotational axis 153. A guide tooth pair 206 is provided for each fluid valve 120 of the second array 92.

In the illustrated embodiment, each guide tooth 200 has the shape of a thin rectangular prism. Each guide tooth 200 has a pair of broad sides 200(1) that face the broad sides of adjacent teeth 200 of the same subset. In addition, each guide tooth 200 terminates in a planar end 200(2). For each guide tooth pair 206, the planar end 200(2) of the tooth 200 that protrudes from the first housing plate 222 (e.g., the tooth 200 of the first subset 201 or the third subset 203) faces, and is spaced apart from, the planar end 200(2) of the tooth 200 that protrudes from the second housing plate 252 (e.g., the tooth 200 of the second subset 202 or the fourth subset 204). The spacing 209 between the respective planar ends 200(2) of the teeth 200 of a given guide tooth pair 206 corresponds to a dimension of the leg 146 of the movable plates 141 of the fluid valves 120.

The teeth 200 of a guide tooth pair 206 cooperate to guide the leg 146 of a fluid valve 120 during rotation of the cam shaft 152. In particular, the teeth 200 of a guide tooth pair 206 cooperate to guide the motion of the leg 146 in a direction parallel to the first housing plate 222. To this end, the spacing 209 is dimensioned to provide a sliding clearance that permits the leg 146 to move with respect to the respective guide teeth 203, 204 without deflection.

Figure 14:
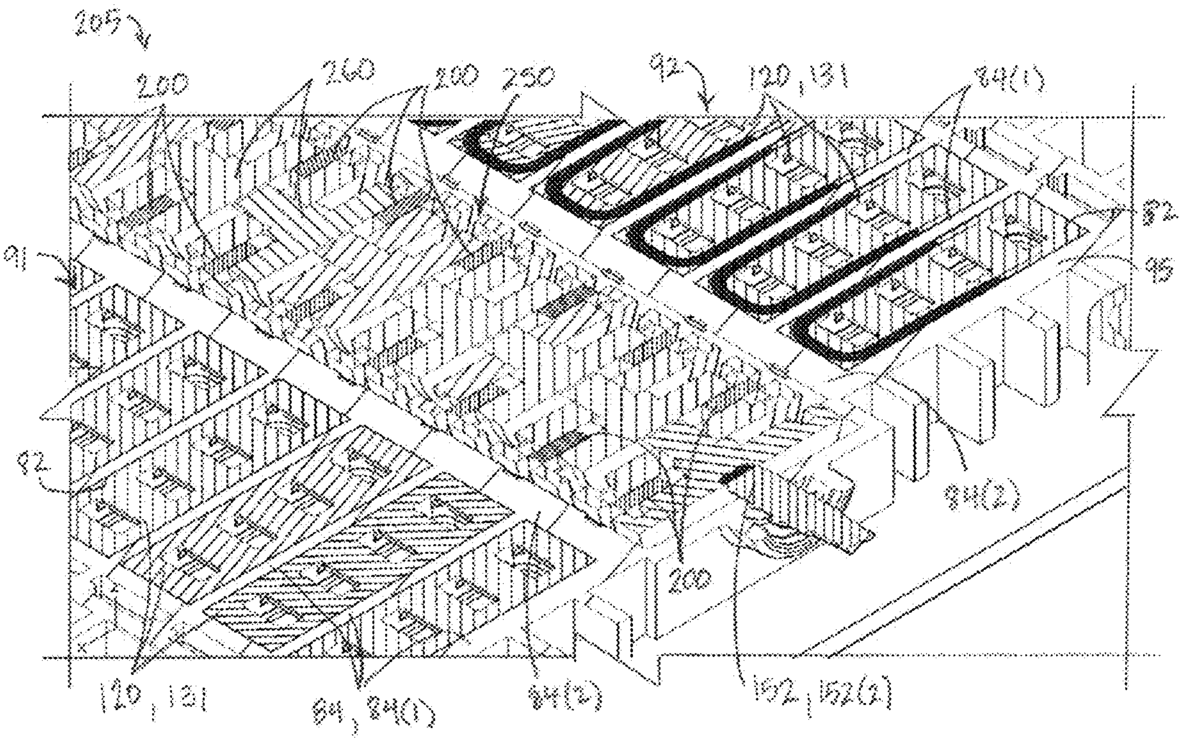
FIG. 14 is a cross-sectional view of the cam-driven fluid valve assembly of FIG. 9 as seen along line 14-14 of FIG. 9, where the cross-section lies in the axial plane 90.
Figure 15:
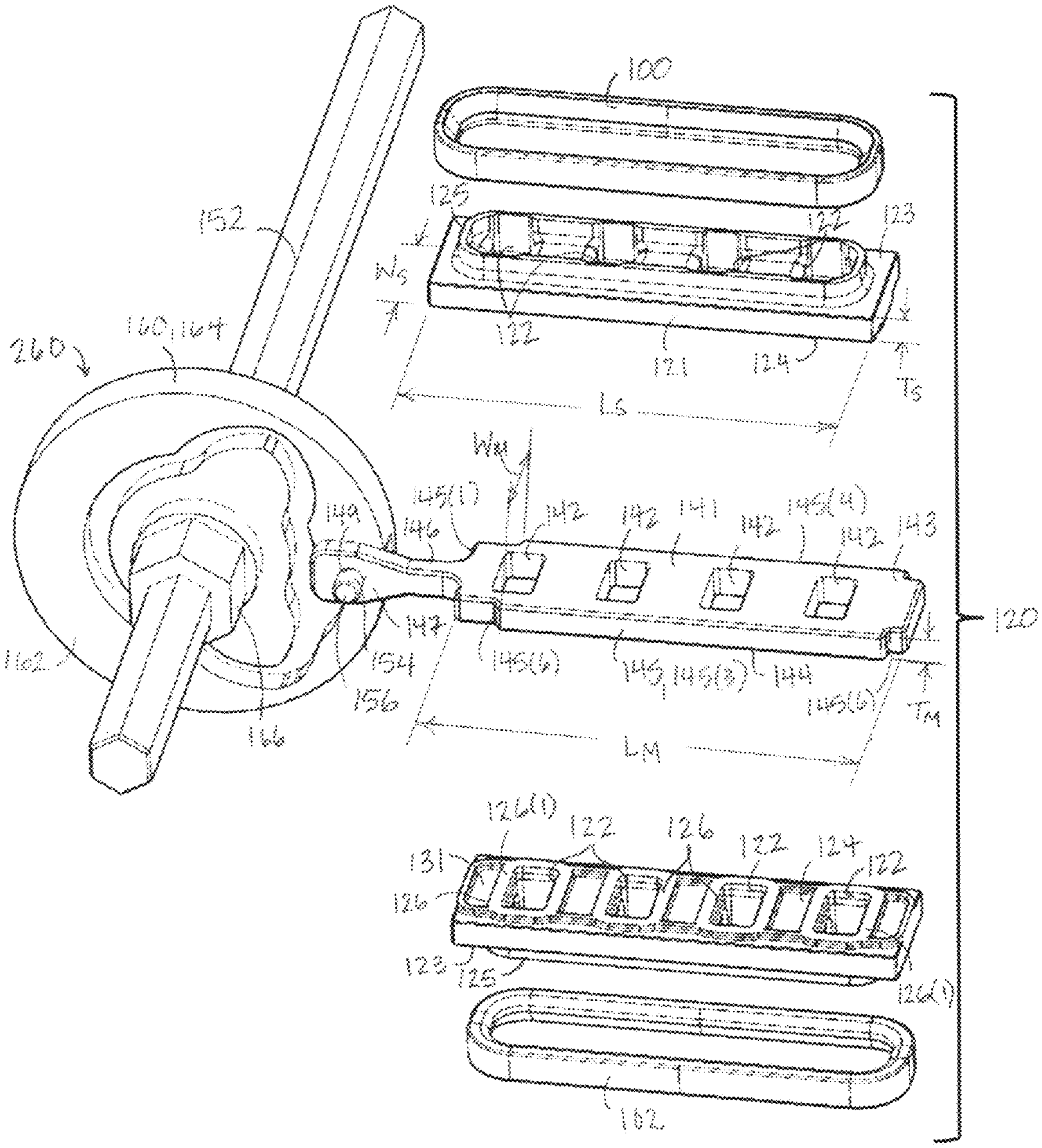
FIG. 15 is an exploded, perspective view of a sliding gate fluid valve.

Referring to FIGS. 14 and 15, in the illustrated embodiments, the fluid valves 120 are sliding gate valves. Actuation of the cam shaft 152 permits each cam 160, 260 to move a movable plate 141 of a corresponding fluid valve 120. In the valve assembly 205, a sliding gate fluid valve 120 is disposed in each of the cells 82 and is configured to control fluid flow between the first valve port 21 and the second valve port 51 of each respective port pair 34. Each sliding gate fluid valve 120 includes a first stationary plate 121, a second stationary plate 131 and a movable plate 141 disposed between the first stationary plate 121 and the second stationary plate 131 in a stacked or layered configuration. The sliding gate fluid valve 120 will now be described in detail.

Although assembled in the sliding gate fluid valve 120 in opposite orientations, the first stationary plate 121 and the second stationary plate 131 are identical in shape and dimension. For this reason, common elements are referred to with common reference numbers and only the first stationary plate 121 will be described in detail.

The first stationary plate 121 is a rigid, rectangular plate having a length dimension $L_S$ that is greater than its width dimension $W_S$, and a width dimension $W_S$ that is greater than its thickness $T_S$ (e.g., height) dimension. For example, in the illustrated embodiment, the length dimension $L_S$ is at least three times the width dimension $W_S$, and the width dimension $W_S$ is at least five times the thickness dimension $T_S$.

The first stationary plate 121 has a first working surface 123 that faces the respective port, and a second working surface 124 that is opposed to the first working surface 123 and faces the movable plate 141. In the case of the first stationary plate 121, the first working surface 123 faces the first valve port 21, whereas in the case of the second stationary plate 131, the first working surface 123 faces the second valve port 51. The first and second working surfaces 123, 124 are parallel to each other and are spaced apart a distance corresponding to the thickness $T_S$ of the first stationary plate 121.

The first stationary plate 121 has at least one first plate through-opening 122 that extends between the first working surface 123 and the second working surface 124. In the illustrated embodiment, the first stationary plate 121 has four first plate through-openings 122 that are spaced apart along the length dimension $L_S$ of the first stationary plate 121. Each first plate through opening 122 has a rectangular profile when viewed facing the first working surface 123 but is not limited to having a profile of this shape.

The first stationary plate 121 includes an outer annular ridge 125 that protrudes from the first working surface 123 and encircles all the first plate through openings 122. In the case of the first stationary plate 121, outer annular ridge 125 locates a first valve seal 100 with respect to the first working surface 123 of the first stationary plate 121. The first valve seal 100 provides a fluid-tight seal between the first stationary plate 121 (e.g., the sliding gate fluid valve 120) and the first manifold 20. In the case of the second stationary plate 131, the outer annular ridge 125 locates a second valve seal 102 with respect to the first working surface 123 of the second stationary plate 131. The second valve seal 102 provides a fluid-tight seal between the second stationary plate 131 (e.g., the sliding gate fluid valve 120) and the second manifold 50.

The first stationary plate 121 includes inner annular ridges 126 that protrude from the second working surface 124. An inner annular ridge 126 encircles each first plate through opening 122. Thus, in the illustrated embodiment, the first stationary plate 121 includes four inner annular ridges 126. The terminal end 126(1) of each inner annular ridge is planar and abuts the movable plate 141. In the case of the first stationary plate 121, the planar terminal end 126(1) forms a fluid tight seal between the first stationary plate 121 and the movable plate 141. In the case of the second stationary plate 131, the planar terminal end 126(1) forms a fluid tight seal between the second stationary plate 131 and the movable plate 141. By this configuration, the inner annular ridges 126 reduce sliding friction between the (fixed) first and second stationary plates 121, 131 and the movable plate 141 during valve operation as compared to a stationary plate having no inner annular ridges.

Each first and second stationary plate 121, 131 of a given fluid valve 120 is disposed in a corresponding cell 82, and each first and second stationary plate 121, 131 is fixed relative to the wall portions 84(1) that define the cell 82. To this end, the wall portions 84(1) that provide each cell 82 are shaped and dimensioned so that each first and second stationary plate 121, 131 is stationary within the cell 82. For example, the wall portions 84(1) define a rectangular opening that receives the first stationary plate 121 therein in a clearance fit (e.g., each cell 82 is formed to closely follow the contours and dimensions of the first stationary plate 121 disposed therein). This is best seen in FIG. 14, which illustrates the valve assembly 205 as seen in a cross-sectional view taken through a plane 95 that is parallel to the first stationary plate 121 and resides below the rotational axis 153 so as to pass through the secondary stationary plates 131 of the fluid valves 120.

The movable plate 141 is a rigid, generally rectangular plate having a length dimension $L_M$ that is greater than its width dimension $W_M$, and a width dimension $W_M$ that is greater than its thickness $T_M$ (e.g., height) dimension. For example, in the illustrated embodiment, the length dimension $L_M$ is at least three times the width dimension $W_M$, and the width dimension $W_M$ is at least five times the thickness dimension $T_M$. The overall dimensions $L_M$, $W_M$, $T_M$ of the movable plate are substantially the same as the overall dimensions $L_S$, $W_S$, $T_S$ of the first and second stationary plates 121, 131.

The movable plate 141 has a first working surface 143 that faces the respective first stationary plate 121, and a second working surface 144 that is opposed to the first working surface 143 and faces the second stationary plate 131. The first and second working surfaces 143, 144 are parallel to each other and are spaced apart a distance corresponding to the thickness $T_M$ of the movable plate 141. In addition, the first and second working surfaces 143, 144 are planar (e.g., lie in a plane) and substantially smooth.

The movable plate 141 has a peripheral surface 145 that extends between the first and second working surfaces 143, 144. The peripheral surface 145 includes a first end surface 145(1) that faces the cam shaft 152, a second end surface 145(2) that is opposite the first end surface 145(1), and a pair side surfaces 145(3), 145(4) that extend in the length direction between the first end surface 145(1) and the second end surface 145(2).

The width of the movable plate 141 is non-uniform. In particular, the width of a central portion of the movable plate 141 is greater than the width of the movable plate 141 at each of the first and second end surfaces 145(1), 145(2). Shoulders 145(6) are formed at the transitions between widths. The shoulders 145(6) are much closer to the respective the first and second end surfaces 145(1), 145(2) than to a mid-length of the movable plate 141. As seen when the movable plate 141 is viewed in top plan view (e.g., in a direction facing the first working surface 143), the central portion of the movable plate 141 is rectangular and has a width $W_M$ that corresponds to the width $W_S$ of the stationary plates 121, 131.

The first end surface 145(1) includes a leg 146 that protrudes outward toward the cam shaft 152. A proximal end of the leg 146 is integral with the movable plate first end surface 145(1). A distal end 147 of the leg 146 is opposite the proximal end and is enlarged relative to the proximal end. The leg distal end 147 includes a through opening 149 that receives a cam follower. In the illustrated embodiment, the cam follower is a pin 154 that is fixed in the opening 149. Ends 156 of the pin 154 protrude from opposed sides of the leg distal end 147 and engage with a cam track of the cam 260, as discussed further below.

The central portion of the movable plate 141 has at least one movable plate through-opening 142 that extends between the first working surface 143 and the second working surface 144. In the illustrated embodiment, the movable plate 141 has four movable plate through-openings 142 that are spaced apart along the length dimension $L_M$ of the movable plate 141. Each movable plate through opening 142 has a profile shape when viewed facing the first working surface 143 that is the same as that of the first plate through-opening 122. Thus, in the illustrated embodiment, the movable plate through-openings 142 have a profile that is rectangular.

Figure 16:
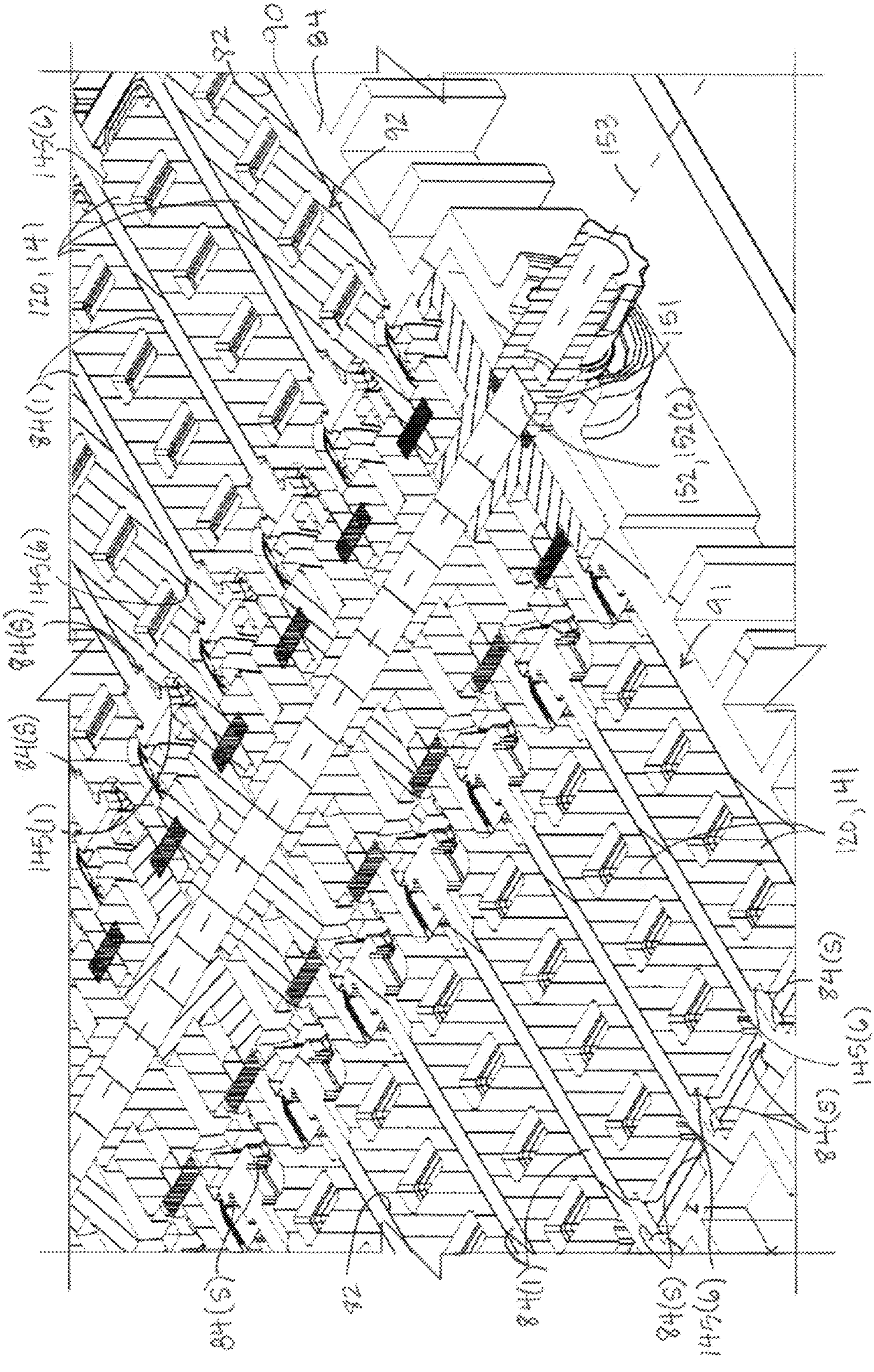
FIG. 16 is a cross-sectional view of the cam-driven fluid valve assembly of FIG. 9, where the cross-section lies in a plane 95 that is parallel to, and slightly below, the axial plane 90 shown in FIG. 14.

Referring to FIG. 16, this figure illustrates the valve assembly 205 as seen in a cross-sectional view taken through a plane 90 that is parallel to the first stationary plate 121 and passes through the rotational axis 153. The movable plate 141 is moveable relative to the first and second stationary plates 121, 131 within the plane 90. To this end, in the vicinity of the movable plate 141, the wall portions 84(1) that provide each cell 82 have substantially the same shape as the movable plate 141. In particular, FIG. 16 shows the movable plate 141 of each fluid valve 120 surrounded by the wall portions 84(1). Although the wall portions 84(1) have the same width dimension as the width dimension $W_M$ of the movable plate 141, the wall portions 84(1) define an opening that is longer than the length dimension $L_M$ to permit movement of the movable plate 141 within the plane 90 in a radial direction of the cam shaft 152. Because the wall portions 84(1) in the vicinity of the movable plate 141 have substantially the same shape as the movable plate 141, the wall portions 84(1) define internal shoulders **84(*s*) that serve as stops to limit the extent of translation of the moveable plate 141 within the cell 82**.

Referring to FIGS. 2 and 13, within each cell 82, the first stationary plate 121 is fixed relative to the wall portions 84(1) so as to face the corresponding first valve port 21. Similarly, the second stationary plate 131 is fixed relative to the wall portions 84(1) so as to face the corresponding second valve port 51 and such that the second plate through openings 122 are aligned with the first plate through-openings 122 in a direction that is parallel to the port pair axis 36 and perpendicular to the plane 90. The movable plate 141 is disposed in the cell 82 between the first stationary plate 121 and the second stationary plate 131 and is moveable relative to the first and second stationary plates 121, 131 within the plane 90. In particular, the movable plate 141 is constrained by the wall portions 84(1) and the stationary plates 121, 131 to move within the plane 90 in a direction that is parallel to the length dimension $L_M$. In the illustrated embodiment, the rotational axis 153 of the cam shaft 152 resides in the plane 90 and the movement direction corresponds to a radius of the cam shaft 152.

The valve assembly 205 includes a cam shaft 152 that extends into the valve chamber 280. In the illustrated embodiment, the cam shaft 152 is a rigid rod having a hexagonal cross-sectional shape. The cam shaft 152 is supported for rotation by the assembly housing 208. More specifically, the cam shaft 152 is disposed in the valve drive region 288 of the valve chamber 280. The second end 152(2) of the cam shaft 152 is supported for rotation by a bearing 151, which in turn is supported by the wall portion 84(2) in the valve drive region 288. The second end 152(2) of the cam shaft 152 protrudes through the valve assembly housing 208 in a sealed manner and is connected to an actuator (not shown). The actuator drives the cam shaft 152 to rotate about the cam shaft rotational axis 153 which extends in parallel to the first and second manifold plates 22, 52. The first end 152(1) of the cam shaft 152 resides within the valve drive region 288.

Figure 17:
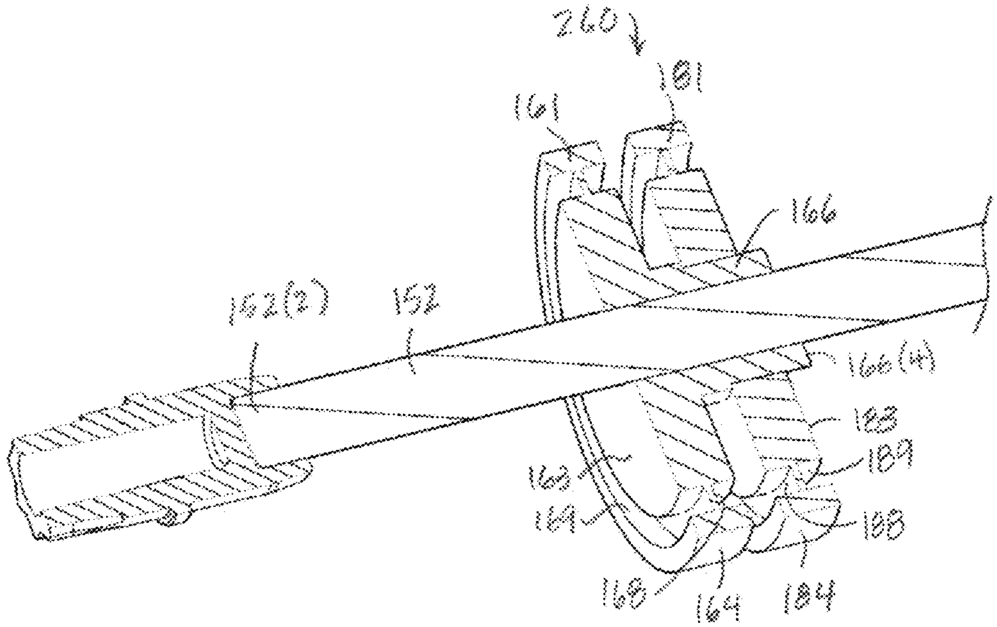
FIG. 17 is a perspective cross-sectional view of a portion of the cam drive assembly of FIG. 9, showing only a single cam of the cam drive assembly.
Figure 18:
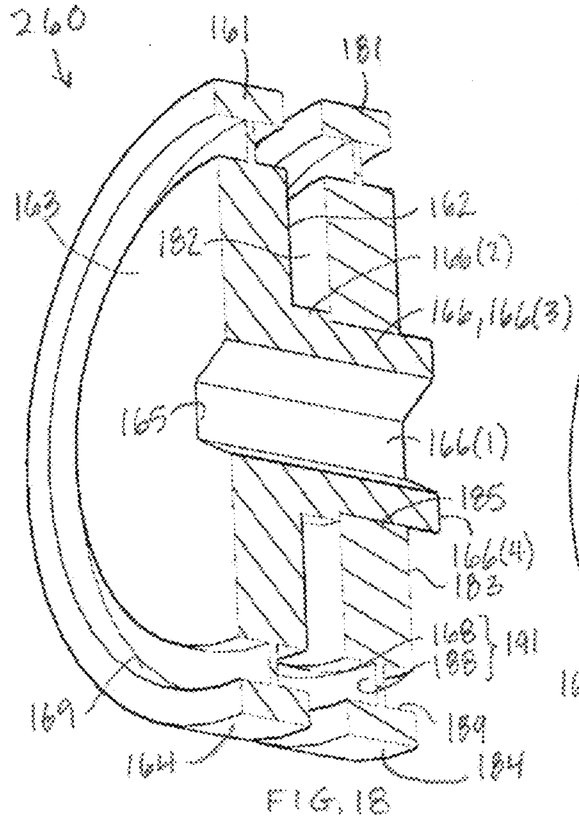
FIG. 18 is a perspective cross-sectional view the cam of FIG. 17.
Figure 19:
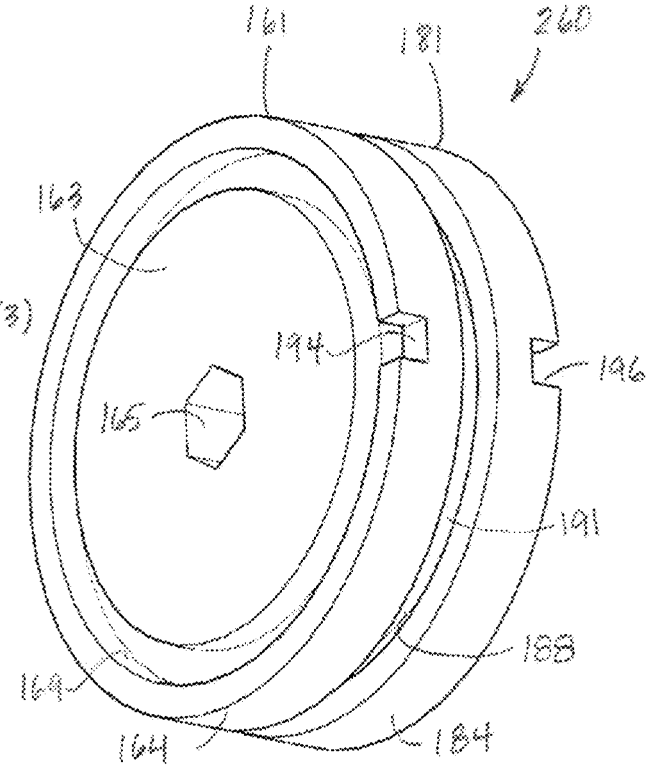
FIG. 19 is a perspective view of the cam of FIG. 17.

Referring to FIGS. 17-19, the valve assembly 205 includes cams 260 that are supported on, and rotate in concert with, the cam shaft 152, which is disposed valve drive region 288 between the first and second fluid valve arrays 91, 92. The cams 260 are arranged side-by-side on the cam shaft 152.

Each cam 260 is an assembly of a first cam disc 161 and a second cam disc 181. As used herein, the term “disc” refers to a cylindrical structure having a diameter that is greater than its height. For example, in the illustrated embodiment, the diameter is at least five times the height. In other embodiments, the diameter may be seven times the height or more. In the illustrated embodiment, the first and second cam discs 161, 181 each have the same diameter and the same height but are not limited to this configuration.

The first cam disc 161 includes a first cam disc inner surface 162 that faces the second cam disc 181, a first cam disc outer surface 163 that is parallel to the first cam disc inner surface 162 and faces away from the second cam disc 181. The first cam disc 161 includes a first cam disc peripheral surface 164 having a circular profile and that extends between the first cam disc inner surface 162 and the first cam disc outer surface 163.

The first cam disc 161 includes a centrally-located first cam disc through opening 165 that extends between the first cam disc inner surface 162 and the first cam disc outer surface 163 and receives the cam shaft 152 therethrough. The first cam disc through opening 165 is shaped and dimensioned to be press fit onto the cam shaft 152. In the illustrated embodiment, the first cam disc through opening 165 has a hexagonal shape to correspond to the cross-sectional shape of the cam shaft 152.

The first cam disc 161 includes a collar 166 that protrudes from the first cam disc inner surface 162 and is centered on the first cam disc inner surface 162. The collar 166 surrounds the first cam disc through opening 165 and an inner surface 166(1) of the collar 166 has the same cross-sectional shape and dimensions as the first cam disc through opening 165, whereby the collar inner surface 166(1) and the inner surface of the first cam disc through opening 165 define a continuous hexagonal bearing surface that engages the cam shaft outer surface.

The collar 166 includes a proximal portion 166(2) that adjoins the first cam disc inner surface 162 and a distal portion 166(3) that is spaced apart from the first cam disc inner surface 162. An outer surface of the collar proximal portion 166(2) has a circular cross-sectional shape and serves as a spacer that maintains a desired spacing between the first and second cam discs 161, 181 when the first and second cam discs 161, 181 are assembled to form the cam 160. An outer surface of the collar distal portion 166(3) is shaped and dimensioned to be received in a central opening (e.g., the second cam disc through opening 185) of the second cam disc 181. In the illustrated embodiment the collar distal portion 166(3) is press fit within the second cam disc through opening 185. In addition, the collar distal portion 166(3) has a hexagonal cross-sectional shape to correspond to the hexagonal cross-sectional shape of the second cam disc through opening 185. In other words, the collar 166 provides a mechanical connection between the first cam disc 161 and the second cam disc 181 that ensures that the first cam disc 161 is fixed to the second cam disc 181. In addition, the collar 166 ensures that the first and second cam discs 161, 181 are parallel to each other with the first cam disc inner surface 183 facing and spaced apart from an inner surface 193 of the second cam disc 181. Still further, the collar 166 retains the first cam disc 161 in a desired rotational orientation relative to the second cam disc 181.

The first cam disc inner surface 162 has a first cam disc inner groove 168 formed therein. The first cam disc inner groove 168 defines an eccentric first path that surrounds at least a portion of the first cam disc through opening 165 and the collar 166. In the illustrated embodiment, the first cam disc inner groove 168 is disposed between the collar 166 and the peripheral surface 184 and completely encircles the collar 166.

The first cam disc outer surface 163 has a first cam disc outer groove 169 formed therein. The first cam disc outer groove 169 defines an eccentric second path that surrounds at least a portion of the first cam disc through opening 165 and the collar 166. In the illustrated embodiment, the first cam disc outer groove 169 is disposed between the collar 166 and the peripheral surface 164 and completely encircles the collar 166.

The second cam disc 181 includes a second cam disc inner surface 182 that faces the first cam disc 161, a second cam disc outer surface 183 that is parallel to the second cam disc inner surface 182 and faces away from the first cam disc 161. The second cam disc 181 includes a second cam disc peripheral surface 184 having a circular profile and that extends between the second cam disc inner surface 182 and the second cam disc outer surface 183.

The second cam disc 181 includes the centrally-located second cam disc through opening 185 that extends between the second cam disc inner surface 182 and the second cam disc outer surface 183. The second cam disc through opening 185 receives the collar 166 in a press fit. In the illustrated embodiment, the second cam disc through opening 185 has a hexagonal shape to correspond to the cross-sectional shape of the outer surface of the collar 166. When the first and second cam discs 161, 181 are assembled, the outer surface of the collar 166 forms an interlocking engagement with the surface of the second cam disc through opening 185. In addition, the axial dimension of the collar 166 is set so that when the collar 166 extends through the second cam disc through opening 185, the collar distal end 166(4) protrudes axially with respect to the second cam disc outer surface 183. This configuration forms a stand off that serves as a spacer that maintains a desired spacing between adjacent cams 260 on the cam shaft 152.

The second cam disc inner surface 182 has a second cam disc inner groove 188 formed therein. The second cam disc inner groove 188 defines an eccentric third path that surrounds at least a portion of the second cam disc through opening 185. In the illustrated embodiment, the second cam disc inner groove 188 is disposed between the collar 166 and the peripheral surface 184 and completely encircles the second cam disc through opening 185.

The second cam disc outer surface 183 has a second cam disc outer groove 189 formed therein. The second cam disc outer groove 189 defines an eccentric fourth path that surrounds at least a portion of the second cam disc through opening 185 and the collar 166. In the illustrated embodiment, the second cam disc outer groove 189 is disposed between the collar 166 and the peripheral surface 184 and completely encircles the collar 166.

In the illustrated embodiment, the peripheral surfaces 164, 184 of the first and second cam discs 161, 181 have a circular profile and provide bearing surfaces that rotatably support the cam 160 with respect to an inner surface of the assembly housing 208. In other embodiments, the peripheral surfaces 164, 184 of the first and second cam discs 161, 181 may have a non-circular profile.

Figure 20:
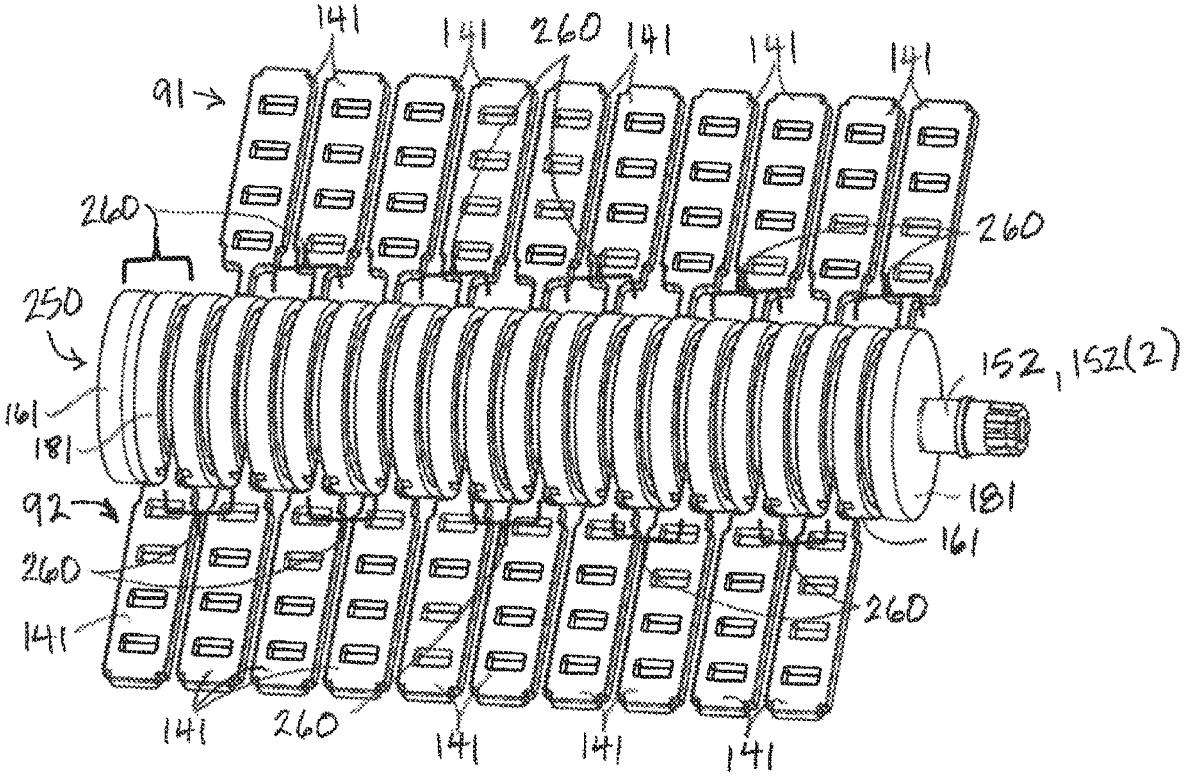
FIG. 20 is a perspective view of the cam drive assembly of FIG. 9 showing only the movable plates of the fluid valves.
Figure 21:
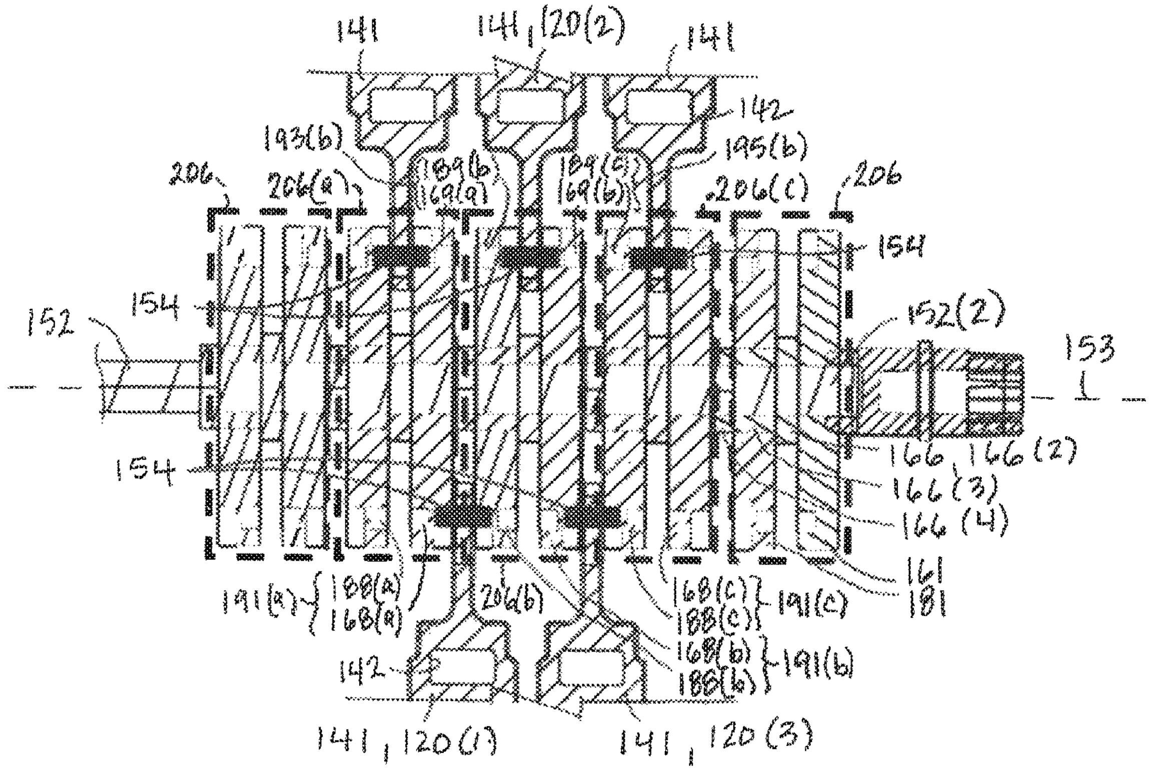
FIG. 21 is a cross-sectional view of a portion of the cam drive assembly illustrating the connections between the movable plates of the fluid valves and the cams.
Figure 22:
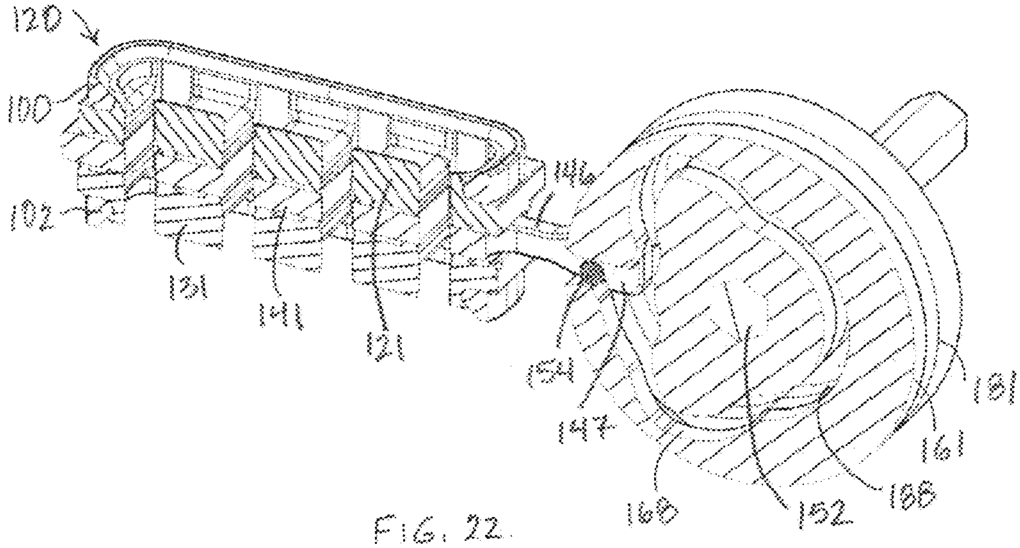
FIG. 22 is a cross-sectional view of a single fluid valve and a corresponding cam.

Referring to FIGS. 20-22, the cams 260 are mounted on the cam shaft 152 in a side-by-side arrangement in which the adjacent cams 260 directly contact each other and the spacing between the facing cam discs 161, 181 of adjacent cams 260 is maintained by the protruding distal end 166(4) of the collar 166.

The profile of second cam disc inner groove 188 is a mirror image of the profile of the first cam disc inner groove 168 when the first and second cam discs 161, 181 are viewed facing their respective inner surfaces 162, 182. As a result, when the first and second discs 161, 181 are assembled to form the cam 260, each point along the second cam disc inner groove 188 is axially aligned with a corresponding point of the first cam disc inner groove 168. As used herein, the term "axially" is used with reference to the rotational axis 153 of the cam shaft 152. When the first and second discs 161, 181 are assembled to form the cam 260, the first cam disc inner groove 168 and the second cam disc inner groove 188 cooperate to form an eccentric inner cam track 191 of the cam 260. The inner cam track 191 of each cam 260 receives and engages with a cam follower 154 of a corresponding sliding gate valve 120.

For each cam 260, the outward-facing planar surface 163, 183 of each disc of the pair of cam discs includes a disc outer groove 169, 189. When a given cam 260(*b*) is mounted on the cam shaft 152 so as to be disposed between two cams 260(*a*), 260(*c*) in a side-by-side arrangement, the first cam disc outer groove 169 (*b*) of the given cam 260(*b*) faces the second cam disc outer groove 189 (*a*) of one adjacent cam 260(*a*). Together, the first cam disc outer groove 169 (*b*) of the given cam 260(*b*) and the second cam disc outer groove 189 (*a*) of the one adjacent cam 260(*a*) cooperate to provide an eccentric first outer cam track 193 that at least partially encircles the cam shaft rotational axis 153.

In addition, the second cam disc outer groove 189 (*b*) of the given cam 260(*b*) faces the first cam disc outer groove 169 (*c*) of the other (e.g., the opposite side) adjacent cam 260(*c*). Together, the second cam disc outer groove 189 (*b*) of the given cam 260(*b*) and the first cam disc outer groove 169 (*c*) of the other adjacent cam 260(*c*) cooperate to provide an eccentric second outer cam track 195 that at least partially encircles the cam shaft rotational axis 153.

Thus, some cams of the cam assembly may include a first outer cam track 193 that controls a position of a movable plate 141 of a first valve 120(1), an inner cam track 191 that controls a position of a movable plate 141 of a second valve 120(2) and a second outer cam track 195 that controls a position of a movable plate 141 of a third valve 120(3).

In this embodiment, for the given cam 260(*b*) the fluid valves 120 (for clarity, only the movable plates 141 are shown in FIGS. 20 and 21) associated with the first and second outer cam tracks 193 (*b*), 195(*b*) are disposed on one side of the rotational axis 153, while the fluid valves 120 of the inner cam track 191(*b*) is disposed on an opposed side of the rotational axis 153. In addition, all the fluid valves 120 are disposed in the common plane 90. This arrangement, in which the fluid valves 120 are coplanar and the fluid valves 120 having an inner track connection are disposed on opposite sides of the rotational axis relative to movable plates having an outer track connection, provides a more closely packed arrangement as compared to an arrangement in which the fluid valves 120 are only connected to the inner cam track 191 of each cam 260 and/or each cam 260 is associated with a single valve 120.

The cams 260 along the cam shaft 152 may each include one or more eccentric cam tracks 191, 193, 195, where each cam track is associated with a different valve 120. In addition, each individual cam track can define a different opening and closing profile or sequence for each valve 120. This allows for individual actuation of each valve 120. In some embodiments, a subset of the valves 120 may open at different times than the other valves 120. In other embodiments, each valve 120 may open at a different time than the other valves 120 of the valve assembly 205.

For each cam 260, the distances of the inner cam track 191, the first outer cam track 193 and the second outer cam track 195 from the rotational axis 153 may vary along a circumference of the respective first and second cam disc 161, 181. Likewise, for each cam 260, the inner cam track 191, the first outer cam track 193 and the second outer cam track 195 form a continuous loop except for a narrow, radially extending channel that extends between the respective track 191, 193, 195 and the peripheral surfaces 164, 184 of the cam discs 161, 181. With respect to the inner cam track 191, the corresponding channel defines an opening 192 that intersects the cam disc peripheral surfaces 164, 184 and communicates with the inner cam track 191. With respect to the first outer cam track 193, the corresponding channel defines an opening 194 that intersects the cam disc peripheral surfaces 164, 184 and communicates with the first outer cam track 193. With respect to the second outer cam track 195, the corresponding channel defines an opening 196 that intersects the cam disc peripheral surfaces 164, 184 and communicates with the second outer cam track 195. The openings 192, 194, 196 are configured to permit a cam follower 154 of a respective fluid valve 120 to enter the corresponding cam tracks for purposes of assembly therewith.

Figure 23:
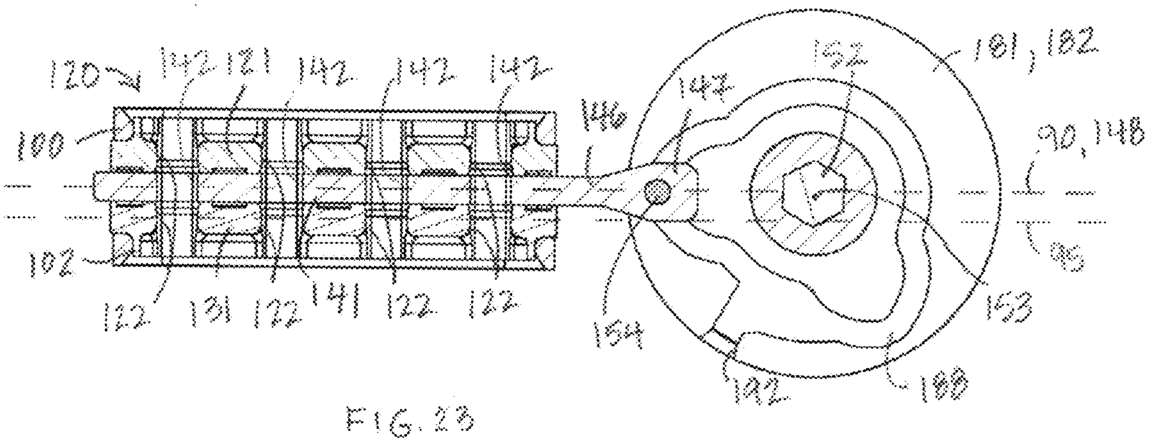
FIG. 23 is a cross-sectional view of the single fluid valve and a corresponding cam of FIG. 22 showing the cam oriented so that the fluid valve is in the first position in which fluid is permitted to flow through the fluid valve.
Figure 24:
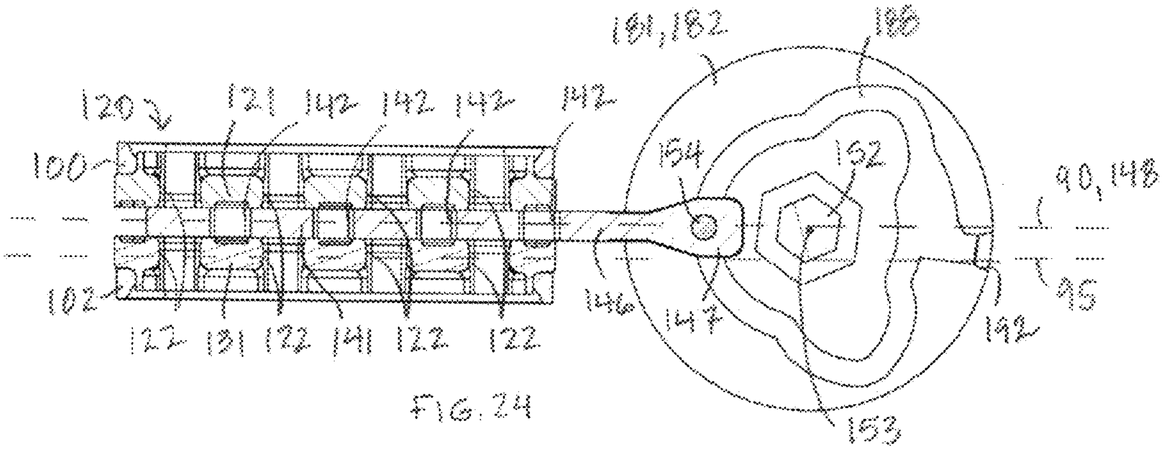
FIG. 24 is a cross-sectional view of the single fluid valve and a corresponding cam of FIG. 22 showing the cam oriented so that the fluid valve is in the second position in which fluid is prevented from flowing through the fluid valve.

Referring to FIGS. 23-24, the movable plate 141 of each of the sliding gate valves 120 is mechanically connected to the corresponding cam 160 in such a way that rotation of the cam 160 results in a corresponding movement of the movable plate 141, and the corresponding movement of the movable plate 141 is independent of a peripheral shape of the cam 160. The movable plate 141 is mechanically connected to one of the inner cam track 191, the first outer cam track 193 or the second outer cam track 195 of the corresponding cam 160 via its cam follower, e.g., the pin 154. The movable plate 141 is moveable relative to the first and second stationary plates 121, 131 of the fluid valve 120 within the plane 90 that is parallel to the first stationary plate 121 upon rotation of the cam 160 about the cam shaft rotational axis 153.

Upon rotation of the cam shaft 152 about the rotational axis 153, the movable plate 141 of each fluid valve 120 is driven by the cam 160 to reciprocate along a movement axis 148 that is perpendicular to the rotational axis 153 and coincides with a radius of the cam shaft 152. In the illustrated embodiment, the movable plate 141 is movable (e.g., reciprocates) between a first position and a second position. In the first position (FIG. 23), the movable plate through-openings 142 are aligned with the through-openings 122 of the first and the second stationary plates 121, 131 and fluid is permitted to flow through the sliding gate fluid valve 120 between the first valve port 21 and the second valve port 51. In the second position (FIG. 24), the movable plate through-openings 142 are not aligned with the through-openings 122 of the first and the second stationary plates 121, 131 and fluid is prevented from flowing through the sliding gate fluid valve 120 between the first valve port 21 and the second valve port 51. Since no overlap exists between the movable plate through-openings 142 and the stationary plate through-openings 122 fluid flow through the fluid valve 120 is prevented when the movable plate 141 is in the second position.

This effect is achieved by varying the distance of the varying the distance of the respective cam track 191, 193 or 195 from the rotational axis 153 in a circumferential direction of the first and second cam discs 161, 181. When the distance of the inner cam track 191 from the rotational axis 153 is at a minimum, the movable plate 141 is in the second position (FIG. 24), and when the distance of the inner cam track 191 from the rotational axis 153 is at a maximum, the movable plate 141 is in the first position (FIG. 23).

The amount of fluid flow through the fluid valve 120 can be made variable by selectively positioning the movable plate 141 at a location between the first position and the second position.

Each sliding gate fluid valve 120 includes annular valve seals 100, 102 that are disposed between the fluid valve 120 and the first and second manifolds 20, 50. In particular, each sliding gate fluid valve 120 includes the first valve seal 100 that is disposed between the first working surface 123 of the first stationary plate 121 and the first manifold 20, providing a fluid tight seal therebetween. The first valve seal 100 surrounds the corresponding first valve port 21 as well as the first stationary plate through openings 122. Each sliding gate fluid valve 120 includes the second valve seal 102 that is disposed between the first working surface 123 of the second stationary plate 131 and the second manifold 50, providing a fluid tight seal therebetween. The second valve seal 102 surrounds the corresponding second valve port 51 as well as the second stationary plate through openings 122.

Each of the first valve seals 100 and the second valve seals 102 may be formed of an elastomer that is compatible with automotive coolant, such as ethylene propylene diene monomer (EPDM). In the illustrated embodiment, the first and second valve seals 100, 102 have a "U" cross-sectional shape that opens facing the respective manifold 20, 50. In other embodiments, the first and second valve seals 100, 102 may have other cross-sectional shapes, such as, but not limited to, circular, rectangular, oval, "X" or "I" shapes.

As previously described, the valve assembly 205 includes two arrays 91, 92 of fluid valves 120 and the cam drive assembly 250 which are disposed in the valve drive region 288 of the valve chamber 280. Each fluid valve 120 is disposed in a respective cell 82 in the valve chamber 280 in alignment with a port pair 34 such that for certain rotational orientations of the cam shaft 152 relative to the assembly housing 208, at least one cam 160 engages a corresponding one of the fluid valves 120 in such a way that the one of the fluid valves 120 is movable between the first position in which fluid is permitted to flow between the first valve port 21 and the second valve port 51 of the port pair 34, and the second position in which fluid is prevented from flowing between the first valve port 21 and the second valve port 51 of the port pair 34.

Each cam 260 is configured to be mechanically engaged with one or more of the fluid valves 120, depending on the location of the respective cam 260 along the rotational axis 153. For example, in the illustrated embodiment, the outermost cam 260 that is disposed at the cam shaft first end 152(1) is connected to a single fluid valve 120 (e.g., via an outer cam track), the opposite outermost cam 260 that is disposed at the cam shaft second end 152(2) is connected to two fluid valves 120 (e.g., via an inner cam track and an outer cam track) and the cams 260 that are disposed between the end cams 260 are each connected to three fluid valves 120 as described above with respect to FIG. 21.

Referring again to FIG. 16, in the valve assembly 205, the cam shaft 152 includes multiple cams 260, for example eleven cams 260 in the illustrated embodiment. Each cell 82 of the first array 91 is aligned with the inner cam track 191 of a single cam 260 which drives the movable plate 141 of the fluid valve 120 disposed in the cell 82. Each cell 82 of the second array 92 is axially offset toward the cam shaft first end 152(1) relative to the cells 82 of the first array 91, whereby each cell 82 of the second array 92 is aligned with a respective outer cam track 193 or 195 defined between adjacent cams 260.

Actuation of the cam shaft 152 permits each cam 260 to move one or more valve bodies, in this embodiment, the movable plate 141, of a corresponding fluid valve 120, whereby the timing, sequencing and pattern of fluid flow through a cooling system that includes the valve assembly 205 can be precisely controlled. The cam shaft 152 and cams 260 are arranged to open and close the fluid valves 120 in such a way that, in cooperation with the first fluid passageways 30 of the first manifold 20 or the second fluid passageways 60 of the second manifold 50, multiple ones of the sliding gate fluid valves 120 may allow direction of fluid to a single other sliding gate fluid valve 120 and/or a single one of the sliding gate fluid valves 120 may direct fluid to multiple other ones of the sliding gate fluid valves 120, depending on operating conditions of the system.

In the illustrated embodiment, the fluid valves 120 are sliding gate valves and each fluid valve 120 is driven to move within the plane 90 via rotation of the cams 160, but the cam-driven fluid valve assembly 205 is not limited to being implemented via a sliding gate valve. For example, in other embodiments, the sliding gate valves may be replaced by another type of valve such as lift valves, disc valves, plug valves, etc.

Although the illustrated embodiment shows that each fluid valve 120 is a sliding gate valve, the cam-driven fluid valve assembly 205 is not limited to having only sliding gate valves. For example, in some embodiments, multiple types of valves may be incorporated into the assembly housing 208. In some embodiments, at least one of the fluid valves is a sliding gate valve 120.

In the illustrated embodiment, the first and second stationary plates 121, 131 have a rectangular profile when viewed in a direction facing the first working surface 123. However, the first and second stationary plates are not limited to having this shape. For example, in some embodiments, the corners of the rectangular profile may be rounded. In other embodiments, the first and second stationary plates 121, 131 may have an oval or irregularly-shaped profile.

In the illustrated embodiment, each cam 260 includes a first cam disc 161 in which the collar inner surface 166(1) defines a hexagonal opening through which the cam shaft 152 extends. The collar inner surface 166(1) is shaped and dimensioned to correspond to the shape and dimensions of the cam shaft 152 so that the cam 260 rotates in concert with the cam shaft 152. However, in other embodiments, splines, keys or other known structures may be used to fix the cams 260 relative to the cam shaft 152.

Selective illustrative embodiments of the cam-driven valve system are described above in some detail. It should be understood that only structures considered necessary for clarifying the cam-driven valve system have been described herein. Other conventional structures, and those of ancillary and auxiliary components of the cam-driven valve system, are assumed to be known and understood by those skilled in the art. Moreover, while a working example of the cam-driven valve system have been described above, the cam-driven valve system is not limited to the working example described above, but various design alterations may be carried out without departing from the cam-driven valve system as set forth in the claims.

We claim:

1. A valve assembly comprising:

an assembly housing having ports, each port configured to permit fluid communication between an environment of the assembly housing and an interior space of the assembly housing;

valves disposed in the interior space, each valve including a valve seat having a valve seat through-opening, the valve seat being disposed in the assembly housing and fixed relative to the assembly housing so as to face a corresponding one of the ports, and a valve body that is movable relative to the valve seat, the valve body being disposed in the assembly housing and movable with the assembly housing between a first position in which fluid is permitted to flow through the valve seat through opening, and a second position in which fluid is prevented from flowing through the valve seat through opening;

a cam shaft supported on the assembly housing, the cam shaft extending into the interior space, the cam shaft configured to rotate about a rotational axis relative to the assembly housing; and cams that are disposed in the interior space and supported on the cam shaft, each cam configured to rotate in concert with the cam shaft, each cam having an inner cam track that is disposed internally with respect to an outer surface of the cam and an outer cam track that is disposed on the outer surface of the cam, wherein each of the inner cam track and the outer cam track of a given cam at least partially encircles the rotational axis, the inner cam track of the given cam is configured to engage with the valve body of a first one of the valves, and the outer cam track of the given cam is configured to engage with the valve body of a second one of the valves, whereby the given cam is capable of moving both the valve body of the first one of the valves and the valve body of the second one of the valves upon rotation of the cam shaft.

2. The valve assembly of claim 1, wherein the outer cam track comprises a first outer cam track and a second outer cam track, the first outer cam track of the given cam is configured to engage with the valve body of the second one of the valves, the second outer cam track of the given cam is configured to engage with the valve body of a third one of the valves, whereby the given cam is capable of moving both the valve body of the first one of the valves, the valve body of the second one of the valves and the valve body of the third one of the valves upon rotation of the cam shaft.

3. The valve assembly of claim 2, wherein the first outer cam track is disposed on a first outer surface of the given cam, and the second outer cam track is disposed on a second outer surface of the given cam, the first outer surface of the given cam and the second outer surface of the given cam being disposed on opposite sides of the given cam.

4. The valve assembly of claim 1, wherein the given cam comprises a pair of cam discs, the pair of cam discs including a first cam disc and a second cam disc, the first cam disc has a first cam disc inner surface that faces the second cam disc, the first cam disc has a first cam disc outer surface on a side of the first cam disc that is opposite the first cam disc inner surface and faces away from the second cam disc, the second cam disc has a second cam disc inner surface that faces the first cam disc, the second cam disc has a second cam disc outer surface on a side of the second cam disc that is opposite the second cam disc inner surface and faces away from the first cam disc, at least one of the first cam disc inner surface and the second cam disc inner surface includes an inner groove that defines the inner cam track.

5. The valve assembly of claim 4 wherein the second cam disc is directly connected to the first cam disc and rotates in concert with the first cam disc.

6. The valve assembly of claim 4, wherein at least one of the first cam disc outer surface and the second cam disc outer surface includes an outer groove that at least partially defines the outer cam track.

7. The valve assembly of claim 4, wherein the outer cam track comprises a first outer cam track and a second outer cam track, the first cam disc outer surface includes a first cam disc outer groove that at least partially defines the first outer cam track, and the second cam disc outer surface includes a second cam disc outer groove that at least partially defines the second outer cam track.

8. The valve assembly of claim 1, wherein each cam comprises a pair of cam discs, the pair of cam discs including a first cam disc and a second cam disc, the first cam disc and the second cam disc of each pair of cam discs cooperate to define the respective inner cam track therebetween, the valve body of the first one of the valves is mechanically connected to the inner cam track of the corresponding one of the cams via a cam follower, and a portion of the cam follower of the valve body of the first one of the valves is received in and engages with the inner cam track.

9. The valve assembly of claim 8, wherein the portion of the cam follower of the valve body of the first one of the valves is a pin that protrudes from at least one of opposed sides of the cam follower and is received in the inner cam track.

10. The valve assembly of claim 8, wherein the valve body of the second one of the valves is mechanically connected to the outer cam track of the corresponding one of the cams via a cam follower, and a portion of the cam follower of the valve body of the second one of the valves is received in and engages with the outer cam track.

11. The valve assembly of claim 1, wherein at least one of the valves is a sliding gate valve in which the valve seat is a stationary plate and the valve body is a movable plate that moves relative to the stationary plate, the movable plate of each sliding gate valve is independently connected to one of the cams via a cam follower, each cam comprises:

- a first cam disc;
- a second cam disc that is fixed to and stacked with the first cam disc in a direction parallel to the rotational axis; and
- the inner cam track that is disposed between the first cam disc and the second cam disc, the inner cam track defined by a surface of at least one of the first cam disc and the second cam disc, and a portion of the cam follower of the movable plate of the at least one of the valves is received in the inner cam track of one of at least one of the cams.

12. The valve assembly of claim 11, wherein each cam includes a cam gap that is disposed between the first cam disc and the second cam disc, and the portion of the cam follower of the movable plate of the at least one of the valves is received in the cam gap.

13. The valve assembly of claim 1, wherein a first one of the cams is connected to a valve body of each of two different valves.

14. The valve assembly of claim 13, wherein a second one of the cams is connected to a valve body of each of three different valves.

15. The valve assembly of claim 1, wherein a valve body of a first one of the valves is connected to a first one of the cams, and a valve of a second one of the valves is connected to both the first one of the cams and a second one of the cams.

16. The valve assembly of claim 1, wherein each cam comprises a first cam disc fixed to a second cam disc, the first cam disc includes

- a first cam inner surface that faces the second cam disc,
- a first cam outer surface that faces away from the second cam disc,
- a first cam through opening that extends between the first cam inner surface and the first cam outer surface and receives the cam shaft therethrough, and
- a first cam disc inner groove formed in the first cam inner surface, the first cam disc inner groove surrounding at least a portion of the first cam through opening, the second cam disc includes

- a second cam inner surface that faces the first cam disc,
- a second cam outer surface that faces away from the first cam disc,
- a second cam through opening that extends between the second cam inner surface and the second cam outer surface and receives the cam shaft therethrough, and
- a second cam disc inner groove formed in the second cam inner surface, the second cam disc inner groove surrounding at least a portion of the second cam through opening, and
- the first cam disc inner groove and the second cam disc inner groove cooperate to form the inner cam track.

17. The valve assembly of claim 16, wherein the second cam disc inner groove has a profile that corresponds to a mirror image of the profile of the first cam disc inner groove.

18. The valve assembly of claim 16, wherein the cams comprise a first cam and a second cam, the first cam disc of the first cam includes a first cam disc outer groove formed in the first cam outer surface, the first cam disc outer groove surrounding at least a portion of the first cam through opening, the second cam disc of the second cam includes a second cam disc outer groove formed in the second cam outer surface, the second cam disc outer groove surrounding at least a portion of the second cam through opening, the first cam outer surface of the first cam faces the second cam outer surface of the second cam, the first cam disc outer groove of the first cam disc of the first cam and the second cam disc outer groove of the second cam disc of the second cam cooperating to form the outer cam track.

* * * * *